(12) United States Patent
Forbes, Jr. et al.

(10) Patent No.: US 9,069,337 B2
(45) Date of Patent: Jun. 30, 2015

(54) SYSTEM AND METHOD FOR ESTIMATING AND PROVIDING DISPATCHABLE OPERATING RESERVE ENERGY CAPACITY THROUGH USE OF ACTIVE LOAD MANAGEMENT

(71) Applicant: Consert Inc., San Antonio, TX (US)

(72) Inventors: Joseph W. Forbes, Jr., Wake Forest, NC (US); Joel L. Webb, Edmond, OK (US)

(73) Assignee: Consert Inc., San Antonio, TX (US)

( * ) Notice: Subject to any disclaimer, the term of this patent is extended or adjusted under 35 U.S.C. 154(b) by 0 days.

(21) Appl. No.: 13/784,211

(22) Filed: Mar. 4, 2013

(65) Prior Publication Data

US 2013/0184888 A1 Jul. 18, 2013

Related U.S. Application Data

(62) Division of application No. 12/775,979, filed on May 7, 2010, now Pat. No. 8,396,606.

(51) Int. Cl.
*G05B 13/02* (2006.01)
*G06Q 10/00* (2012.01)
(Continued)

(52) U.S. Cl.
CPC .............. *G05B 13/02* (2013.01); *G06Q 10/00* (2013.01); *H02J 3/14* (2013.01); *H02J 2003/003* (2013.01);
(Continued)

(58) Field of Classification Search
USPC .............. 700/22, 65–66, 286, 291, 295, 297; 705/7.12, 7.25, 7.35, 14.24, 63, 412
See application file for complete search history.

(56) References Cited

U.S. PATENT DOCUMENTS

| 3,906,242 A | 9/1975 | Stevenson |
|---|---|---|
| 4,023,043 A | 5/1977 | Stevenson |

(Continued)

FOREIGN PATENT DOCUMENTS

| EP | 1 729 223 A2 | 12/2006 |
|---|---|---|
| JP | 2000078748 A | 3/2000 |

(Continued)

OTHER PUBLICATIONS

U.S. Patent and Trademark Office; Office Action dated Jun. 1, 2012, as entered in parent U.S. Appl. No. 12/775,979 (6 pages).

(Continued)

*Primary Examiner* — Mohammad Ali
*Assistant Examiner* — Nathan Laughlin
(74) *Attorney, Agent, or Firm* — Daniel C. Crilly; GrayRobinson, P.A.

(57) ABSTRACT

A utility employs a method for estimating available operating reserve. Electric power consumption by at least one device serviced by the utility is determined during at least one period of time to produce power consumption data. The power consumption data is stored in a repository. A determination is made that a control event is to occur during which power is to be reduced to one or more devices. Prior to the control event and under an assumption that it is not to occur, power consumption behavior expected of the device(s) is estimated for a time period during which the control event is expected to occur based on the stored power consumption data. Additionally, prior to the control event, projected energy savings resulting from the control event are determined based on the devices' estimated power consumption behavior. An amount of available operating reserve is determined based on the projected energy savings.

20 Claims, 12 Drawing Sheets

(51) Int. Cl.
*H02J 3/14* (2006.01)
*G06Q 50/06* (2012.01)
*H02J 3/00* (2006.01)

(52) U.S. Cl.
CPC ............ *Y02B 70/3225* (2013.01); *Y04S 20/222* (2013.01); *G06Q 50/06* (2013.01); *Y04S 10/54* (2013.01); *Y04S 10/545* (2013.01); *Y02E 40/76* (2013.01)

(56) References Cited

U.S. PATENT DOCUMENTS

| | | |
|---|---|---|
| 4,077,061 A | 2/1978 | Johnston et al. |
| 4,589,075 A | 5/1986 | Buennagel |
| 4,799,059 A | 1/1989 | Grindahl et al. |
| 4,819,180 A | 4/1989 | Hedman et al. |
| 4,819,229 A | 4/1989 | Pritty et al. |
| 5,193,111 A | 3/1993 | Matty et al. |
| 5,237,507 A | 8/1993 | Chasek |
| 5,361,982 A | 11/1994 | Liebl et al. |
| 5,388,101 A | 2/1995 | Dinkins |
| 5,481,546 A | 1/1996 | Dinkins |
| 5,495,239 A | 2/1996 | Ouellette |
| 5,502,339 A | 3/1996 | Hartig |
| 5,544,036 A | 8/1996 | Brown et al. |
| 5,553,094 A | 9/1996 | Johnson et al. |
| 5,570,002 A | 10/1996 | Castleman |
| 5,592,491 A | 1/1997 | Dinkins |
| 5,640,153 A | 6/1997 | Hildebrand et al. |
| 5,644,173 A | 7/1997 | Elliason et al. |
| 5,675,503 A | 10/1997 | Moe et al. |
| 5,682,422 A | 10/1997 | Oliver |
| 5,696,695 A | 12/1997 | Ehlers et al. |
| 5,721,936 A | 2/1998 | Kikinis et al. |
| 5,748,104 A | 5/1998 | Argyroudis et al. |
| 5,892,758 A | 4/1999 | Argyroudis |
| 5,926,776 A | 7/1999 | Glorioso et al. |
| 6,014,089 A | 1/2000 | Tracey et al. |
| 6,018,690 A | 1/2000 | Saito et al. |
| 6,047,274 A | 4/2000 | Johnson et al. |
| 6,078,785 A | 6/2000 | Bush |
| 6,102,487 A | 8/2000 | Ovrebo |
| 6,115,676 A | 9/2000 | Rector et al. |
| 6,122,603 A | 9/2000 | Budike, Jr. |
| 6,154,859 A | 11/2000 | Norizuki et al. |
| 6,178,362 B1 | 1/2001 | Woolard et al. |
| 6,185,483 B1 | 2/2001 | Drees |
| 6,216,956 B1 | 4/2001 | Ehlers et al. |
| 6,233,327 B1 | 5/2001 | Petite |
| 6,254,009 B1 | 7/2001 | Proffitt et al. |
| 6,304,552 B1 | 10/2001 | Chapman et al. |
| 6,374,101 B1 | 4/2002 | Gelbien |
| 6,437,692 B1 | 8/2002 | Petite et al. |
| 6,519,509 B1 | 2/2003 | Nierlich et al. |
| 6,535,797 B1 | 3/2003 | Bowles et al. |
| 6,577,962 B1 | 6/2003 | Afshari |
| 6,601,033 B1 | 7/2003 | Sowinski |
| 6,621,179 B1 | 9/2003 | Howard |
| 6,622,097 B2 | 9/2003 | Hunter |
| 6,622,925 B2 | 9/2003 | Carner et al. |
| 6,628,113 B2 | 9/2003 | Gallavan |
| 6,633,823 B2 | 10/2003 | Bartone et al. |
| 6,671,586 B2 | 12/2003 | Davis et al. |
| 6,681,154 B2 | 1/2004 | Nierlich et al. |
| 6,687,574 B2 | 2/2004 | Pietrowicz et al. |
| 6,718,177 B1 | 4/2004 | Comer et al. |
| 6,732,055 B2 | 5/2004 | Bagepalli et al. |
| 6,747,571 B2 | 6/2004 | Fierro et al. |
| 6,778,882 B2 | 8/2004 | Spool et al. |
| 6,784,807 B2 | 8/2004 | Petite et al. |
| 6,785,592 B1 | 8/2004 | Smith et al. |
| 6,832,135 B2 | 12/2004 | Ying |
| 6,834,811 B1 | 12/2004 | Huberman et al. |
| 6,836,737 B2 | 12/2004 | Petite et al. |
| 6,862,498 B2 | 3/2005 | Davis et al. |
| 6,865,450 B2 | 3/2005 | Masticola et al. |
| 6,868,293 B1 | 3/2005 | Schurr et al. |
| 6,879,059 B2 | 4/2005 | Sleva |
| 6,882,498 B2 | 4/2005 | Kurumatani et al. |
| 6,891,838 B1 | 5/2005 | Petite et al. |
| 6,904,336 B2 | 6/2005 | Raines et al. |
| 6,906,617 B1 | 6/2005 | Van der Meulen |
| 6,909,942 B2 | 6/2005 | Andarawis et al. |
| 6,914,533 B2 | 7/2005 | Petite |
| 6,914,893 B2 | 7/2005 | Petite |
| 6,934,316 B2 | 8/2005 | Cornwall et al. |
| 6,961,641 B1 | 11/2005 | Forth et al. |
| 6,965,302 B2 | 11/2005 | Mollenkopf et al. |
| 6,965,303 B2 | 11/2005 | Mollenkopf |
| 6,980,090 B2 | 12/2005 | Mollenkopf |
| 6,980,091 B2 | 12/2005 | White, II et al. |
| 6,990,593 B2 | 1/2006 | Nakagawa |
| 6,998,962 B2 | 2/2006 | Cope et al. |
| 7,003,640 B2 | 2/2006 | Mayo et al. |
| 7,019,667 B2 | 3/2006 | Petite et al. |
| 7,035,719 B2 | 4/2006 | Howard et al. |
| 7,039,532 B2 | 5/2006 | Hunter |
| 7,051,332 B2 | 5/2006 | Gatto et al. |
| 7,053,767 B2 | 5/2006 | Petite et al. |
| 7,075,414 B2 | 7/2006 | Giannini et al. |
| 7,079,810 B2 | 7/2006 | Petite et al. |
| 7,088,014 B2 | 8/2006 | Nierlich et al. |
| 7,089,125 B2 | 8/2006 | Sonderegger |
| 7,103,511 B2 | 9/2006 | Petite |
| 7,123,994 B2 | 10/2006 | Weik et al. |
| 7,130,719 B2 | 10/2006 | Ehlers et al. |
| 7,133,750 B2 | 11/2006 | Raines et al. |
| 7,151,943 B2 | 12/2006 | Comer et al. |
| 7,177,728 B2 | 2/2007 | Gardner |
| 7,181,320 B2 | 2/2007 | Whiffen et al. |
| 7,184,861 B2 | 2/2007 | Petite |
| 7,200,134 B2 | 4/2007 | Proctor, Jr. et al. |
| 7,206,670 B2 | 4/2007 | Pimputkar et al. |
| 7,209,804 B2 | 4/2007 | Curt et al. |
| 7,209,840 B2 | 4/2007 | Petite et al. |
| 7,231,280 B2 | 6/2007 | Costa |
| 7,233,843 B2 | 6/2007 | Budhraja et al. |
| 7,245,212 B2 | 7/2007 | Cope et al. |
| 7,250,848 B2 | 7/2007 | White, II |
| 7,263,073 B2 | 8/2007 | Petite et al. |
| 7,274,975 B2 | 9/2007 | Miller |
| 7,283,580 B2 | 10/2007 | Cumeralto et al. |
| 7,289,887 B2 | 10/2007 | Rodgers |
| 7,295,128 B2 | 11/2007 | Petite |
| 7,301,440 B2 | 11/2007 | Mollenkopf |
| 7,305,282 B2 | 12/2007 | Chen |
| 7,313,465 B1 | 12/2007 | O'Donnell |
| 7,321,316 B2 | 1/2008 | Hancock et al. |
| 7,323,970 B1 | 1/2008 | Murray et al. |
| 7,333,880 B2 | 2/2008 | Brewster et al. |
| 7,343,341 B2 | 3/2008 | Sandor et al. |
| 7,345,998 B2 | 3/2008 | Cregg et al. |
| 7,346,463 B2 | 3/2008 | Petite et al. |
| 7,366,164 B1 | 4/2008 | Habib et al. |
| 7,397,907 B2 | 7/2008 | Petite |
| 7,406,364 B2 | 7/2008 | Andrén et al. |
| 7,412,304 B2 | 8/2008 | Uenou |
| 7,424,527 B2 | 9/2008 | Petite |
| 7,440,871 B2 | 10/2008 | McConnell et al. |
| 7,451,019 B2 | 11/2008 | Rodgers |
| 7,468,661 B2 | 12/2008 | Petite et al. |
| 7,480,501 B2 | 1/2009 | Petite |
| 7,486,681 B2 | 2/2009 | Weber |
| 7,528,503 B2 | 5/2009 | Rognli et al. |
| 7,536,240 B2 | 5/2009 | McIntyre et al. |
| 7,541,941 B2 | 6/2009 | Bogolea et al. |
| 7,565,227 B2 | 7/2009 | Richard et al. |
| 7,639,157 B1 | 12/2009 | Whitley et al. |
| 7,650,425 B2 | 1/2010 | Davis et al. |
| 7,697,492 B2 | 4/2010 | Petite |
| 7,701,325 B2 | 4/2010 | White, II |
| 7,711,796 B2 | 5/2010 | Gutt et al. |
| 7,715,951 B2 | 5/2010 | Forbes, Jr. et al. |
| 7,738,999 B2 | 6/2010 | Petite |

(56) References Cited

U.S. PATENT DOCUMENTS

| | | |
|---|---|---|
| 7,739,378 B2 | 6/2010 | Petite |
| 7,880,599 B2 | 2/2011 | Murray et al. |
| 7,936,256 B2 | 5/2011 | Murray et al. |
| 8,010,812 B2 | 8/2011 | Forbes, Jr. et al. |
| 8,018,884 B2 | 9/2011 | Lee et al. |
| 8,032,233 B2 | 10/2011 | Forbes, Jr. et al. |
| 8,131,403 B2 | 3/2012 | Forbes, Jr. et al. |
| 8,138,934 B2 | 3/2012 | Veillette et al. |
| 8,145,361 B2 | 3/2012 | Forbes, Jr. et al. |
| 8,203,463 B2 | 6/2012 | Bragg et al. |
| 8,253,549 B2 | 8/2012 | Murray et al. |
| 8,260,470 B2 | 9/2012 | Forbes, Jr. et al. |
| 8,307,225 B2 | 11/2012 | Forbes, Jr. et al. |
| 8,315,717 B2 | 11/2012 | Forbes, Jr. et al. |
| 8,390,221 B2 | 3/2013 | Jayanth et al. |
| 8,396,606 B2 | 3/2013 | Forbes, Jr. et al. |
| 8,527,107 B2 | 9/2013 | Forbes, Jr. et al. |
| 8,542,685 B2 | 9/2013 | Forbes, Jr. et al. |
| 2001/0025209 A1 | 9/2001 | Fukui et al. |
| 2001/0030468 A1 | 10/2001 | Anderson et al. |
| 2001/0038343 A1 | 11/2001 | Meyer et al. |
| 2002/0019802 A1 | 2/2002 | Malme et al. |
| 2002/0035496 A1 | 3/2002 | Fujushima et al. |
| 2002/0109607 A1 | 8/2002 | Cumeralto et al. |
| 2002/0138176 A1 | 9/2002 | Davis et al. |
| 2002/0143693 A1 | 10/2002 | Soestbergen et al. |
| 2003/0009705 A1 | 1/2003 | Thelander et al. |
| 2003/0036820 A1 | 2/2003 | Yellepeddy et al. |
| 2003/0040844 A1 | 2/2003 | Spool et al. |
| 2003/0063723 A1 | 4/2003 | Booth et al. |
| 2003/0074304 A1 | 4/2003 | Okada |
| 2003/0083980 A1 | 5/2003 | Satake |
| 2003/0144864 A1 | 7/2003 | Mazzarella |
| 2003/0225483 A1 | 12/2003 | Santinato et al. |
| 2003/0229572 A1 | 12/2003 | Raines et al. |
| 2003/0233201 A1 | 12/2003 | Horst et al. |
| 2004/0002792 A1 | 1/2004 | Hoffknecht |
| 2004/0006439 A1 | 1/2004 | Hunter |
| 2004/0088083 A1 | 5/2004 | Davis et al. |
| 2004/0095237 A1 | 5/2004 | Chen et al. |
| 2004/0117330 A1 | 6/2004 | Ehlers et al. |
| 2004/0128266 A1 | 7/2004 | Yellepeddy et al. |
| 2004/0153170 A1 | 8/2004 | Santacatterina et al. |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2004/0230533 A1 | 11/2004 | Benco |
| 2005/0033481 A1 | 2/2005 | Budhraja et al. |
| 2005/0055432 A1 | 3/2005 | Rodgers |
| 2005/0065742 A1 | 3/2005 | Rodgers |
| 2005/0096856 A1 | 5/2005 | Lubkeman et al. |
| 2005/0096857 A1 | 5/2005 | Hunter |
| 2005/0116836 A1 | 6/2005 | Perry et al. |
| 2005/0125243 A1 | 6/2005 | Villalobos |
| 2005/0138432 A1 | 6/2005 | Ransom et al. |
| 2005/0192711 A1 | 9/2005 | Raines et al. |
| 2005/0192713 A1 | 9/2005 | Weik et al. |
| 2005/0216302 A1 | 9/2005 | Raji et al. |
| 2005/0216580 A1 | 9/2005 | Raji et al. |
| 2005/0234600 A1 | 10/2005 | Boucher et al. |
| 2005/0240314 A1 | 10/2005 | Martinez |
| 2005/0240315 A1 | 10/2005 | Booth et al. |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2006/0020544 A1 | 1/2006 | Kaveski |
| 2006/0022841 A1 | 2/2006 | Hoiness et al. |
| 2006/0025891 A1 | 2/2006 | Budike, Jr. |
| 2006/0031934 A1 | 2/2006 | Kriegel |
| 2006/0064205 A1 | 3/2006 | Ying |
| 2006/0106635 A1 | 5/2006 | Ulrich et al. |
| 2006/0142900 A1 | 6/2006 | Rothman et al. |
| 2006/0142961 A1 | 6/2006 | Johnson et al. |
| 2006/0161450 A1 | 7/2006 | Carey et al. |
| 2006/0168191 A1 | 7/2006 | Ives |
| 2006/0195334 A1 | 8/2006 | Reeb et al. |
| 2006/0259199 A1 | 11/2006 | Gjerde et al. |
| 2006/0271214 A1 | 11/2006 | Brown |
| 2006/0271244 A1 | 11/2006 | Cumming et al. |
| 2006/0271314 A1 | 11/2006 | Hayes |
| 2007/0010914 A1 | 1/2007 | Johnson et al. |
| 2007/0021874 A1 | 1/2007 | Rognli et al. |
| 2007/0025249 A1 | 2/2007 | Yeom |
| 2007/0058453 A1 | 3/2007 | Shaffer et al. |
| 2007/0058629 A1 | 3/2007 | Luft |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1 | 5/2007 | Balan et al. |
| 2007/0203722 A1 | 8/2007 | Richards et al. |
| 2007/0204176 A1 | 8/2007 | Shaffer et al. |
| 2007/0205915 A1 | 9/2007 | Shuey et al. |
| 2007/0213878 A1 | 9/2007 | Chen |
| 2007/0255457 A1 | 11/2007 | Whitcomb et al. |
| 2007/0286210 A1 | 12/2007 | Gutt et al. |
| 2007/0291644 A1 | 12/2007 | Roberts et al. |
| 2007/0299562 A1 | 12/2007 | Kates |
| 2008/0015975 A1 | 1/2008 | Ivchenko et al. |
| 2008/0015976 A1 | 1/2008 | Sandor et al. |
| 2008/0091625 A1 | 4/2008 | Kremen |
| 2008/0130673 A1 | 6/2008 | Cregg et al. |
| 2008/0147465 A1 | 6/2008 | Raines et al. |
| 2008/0165714 A1 | 7/2008 | Dettinger et al. |
| 2008/0167756 A1 | 7/2008 | Golden et al. |
| 2008/0172312 A1 | 7/2008 | Synesiou et al. |
| 2008/0177423 A1 | 7/2008 | Brickfield et al. |
| 2008/0177678 A1 | 7/2008 | Di Martini et al. |
| 2008/0183523 A1 | 7/2008 | Dikeman |
| 2008/0201255 A1 | 8/2008 | Green |
| 2008/0224892 A1 | 9/2008 | Bogolea et al. |
| 2008/0228630 A1 | 9/2008 | Gotthelf et al. |
| 2008/0231114 A1 | 9/2008 | Tolnar et al. |
| 2008/0238710 A1 | 10/2008 | Tolnar et al. |
| 2008/0255899 A1 | 10/2008 | McConnell et al. |
| 2008/0275815 A1 | 11/2008 | Musier et al. |
| 2008/0281473 A1 | 11/2008 | Pitt |
| 2009/0018884 A1 | 1/2009 | McConnell et al. |
| 2009/0043519 A1 | 2/2009 | Bridges et al. |
| 2009/0043520 A1 | 2/2009 | Pollack et al. |
| 2009/0055031 A1 | 2/2009 | Slota et al. |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. |
| 2009/0088991 A1 | 4/2009 | Brzezowski et al. |
| 2009/0106571 A1 | 4/2009 | Low et al. |
| 2009/0112758 A1 | 4/2009 | Herzig |
| 2009/0135836 A1 | 5/2009 | Veillette |
| 2009/0157510 A1 | 6/2009 | Pridmore et al. |
| 2009/0171975 A1 | 7/2009 | McConnell et al. |
| 2009/0177505 A1 | 7/2009 | Dietrich et al. |
| 2009/0184689 A1 | 7/2009 | Kressner et al. |
| 2009/0187499 A1 | 7/2009 | Mulder et al. |
| 2009/0192894 A1 | 7/2009 | Dikeman |
| 2009/0210295 A1 | 8/2009 | Edholm et al. |
| 2009/0228320 A1 | 9/2009 | Lopez et al. |
| 2009/0228406 A1 | 9/2009 | Lopez et al. |
| 2009/0240381 A1 | 9/2009 | Lane |
| 2009/0265568 A1 | 10/2009 | Jackson |
| 2009/0313033 A1 | 12/2009 | Hafner et al. |
| 2009/0319091 A1 | 12/2009 | Flohr |
| 2010/0017045 A1 | 1/2010 | Nesler et al. |
| 2010/0023376 A1 | 1/2010 | Brown |
| 2010/0042420 A1 | 2/2010 | Hutchinson |
| 2010/0063832 A1 | 3/2010 | Brown |
| 2010/0076825 A1 | 3/2010 | Sato et al. |
| 2010/0106575 A1 | 4/2010 | Bixby et al. |
| 2010/0117621 A1 | 5/2010 | Veskovic et al. |
| 2010/0145534 A1 | 6/2010 | Forbes, Jr. et al. |
| 2010/0161148 A1 | 6/2010 | Forbes, Jr. et al. |
| 2010/0179670 A1 | 7/2010 | Forbes, Jr. et al. |
| 2010/0191862 A1 | 7/2010 | Forbes, Jr. et al. |
| 2010/0198713 A1 | 8/2010 | Forbes, Jr. et al. |
| 2010/0218010 A1 | 8/2010 | Musti et al. |
| 2010/0222935 A1 | 9/2010 | Forbes, Jr. et al. |

(56) References Cited

U.S. PATENT DOCUMENTS

| | | | |
|---|---|---|---|
| 2010/0225452 | A1 | 9/2010 | Murdoch |
| 2010/0228601 | A1 | 9/2010 | Vaswani et al. |
| 2010/0228861 | A1 | 9/2010 | Arsovski et al. |
| 2010/0235008 | A1 | 9/2010 | Forbes, Jr. et al. |
| 2010/0254290 | A1 | 10/2010 | Gong et al. |
| 2011/0022239 | A1 | 1/2011 | Forbes, Jr. |
| 2011/0029655 | A1 | 2/2011 | Forbes, Jr. |
| 2011/0061014 | A1 | 3/2011 | Frader-Thompson et al. |
| 2011/0063126 | A1 | 3/2011 | Kennedy et al. |
| 2011/0082598 | A1 | 4/2011 | Boretto et al. |
| 2011/0115302 | A1 | 5/2011 | Slota et al. |
| 2011/0125422 | A1 | 5/2011 | Goncalves Jota et al. |
| 2011/0133655 | A1 | 6/2011 | Recker et al. |
| 2011/0144819 | A1 | 6/2011 | Andrews et al. |
| 2011/0172837 | A1 | 7/2011 | Forbes, Jr. |
| 2011/0172841 | A1 | 7/2011 | Forbes, Jr. |
| 2011/0196546 | A1 | 8/2011 | Muller et al. |
| 2011/0231320 | A1 | 9/2011 | Irving |
| 2011/0251730 | A1 | 10/2011 | Pitt |
| 2011/0251807 | A1 | 10/2011 | Rada et al. |
| 2011/0257809 | A1 | 10/2011 | Forbes, Jr. et al. |
| 2011/0258022 | A1 | 10/2011 | Forbes, Jr. et al. |
| 2012/2010019 | | 4/2012 | Slutsker et al. |
| 2013/0120881 | A1 | 5/2013 | Jayanth et al. |

FOREIGN PATENT DOCUMENTS

| | | |
|---|---|---|
| JP | 2001008380 A | 1/2001 |
| JP | 2001306839 | 11/2001 |
| JP | 2002133568 A | 5/2002 |
| JP | 2002176729 | 6/2002 |
| JP | 2002281666 | 9/2002 |
| JP | 2003067457 | 3/2003 |
| JP | 2004248174 A | 2/2004 |
| JP | 2004112868 | 4/2004 |
| JP | 2004180412 | 6/2004 |
| JP | 2004301505 A | 10/2004 |
| JP | 2006060911 A | 3/2006 |
| JP | 2006277597 | 10/2006 |
| JP | 2007132553 A | 5/2007 |
| JP | 2010081722 A | 4/2010 |
| JP | 2010119269 A | 5/2010 |
| JP | 2010183760 A | 8/2010 |
| KR | 2005001584 A | 1/2005 |
| KR | 20050045272 A | 5/2005 |
| KR | 20060036171 A | 4/2006 |
| KR | 20070008321 A | 1/2007 |
| KR | 100701298 B1 | 3/2007 |
| KR | 20070098172 A | 10/2007 |
| KR | 20080112692 A | 12/2008 |
| WO | 2005029243 A2 | 3/2005 |
| WO | 2007136456 A2 | 11/2007 |
| WO | WO 2008/125696 A2 | 10/2008 |
| WO | 2009032162 A2 | 3/2009 |
| WO | 2009132161 A2 | 3/2009 |
| WO | 2010129958 A2 | 5/2010 |
| WO | 2010129059 A1 | 11/2010 |
| WO | 2010132456 A2 | 11/2010 |
| WO | 2010132469 A2 | 11/2010 |
| WO | 2010132477 A1 | 11/2010 |
| WO | 2010134987 A1 | 11/2010 |
| WO | 2011043818 A2 | 4/2011 |
| WO | 2011046589 A1 | 4/2011 |
| WO | 2012106431 A1 | 8/2012 |
| WO | 2012145102 A2 | 10/2012 |

OTHER PUBLICATIONS

Korean Intellectual Property Office, Notification of Provisional Rejection dated Dec. 14, 2012, as entered in related Korean Application No. 10-2011-7030546 (Korean counterpart to U.S. Appl. No. 12/783,415) (2 pages).
U.S. Patent and Trademark Office; Final Office Action dated Jan. 4, 2013, as entered in related U.S. Appl. No. 12/783,415 (39 pages).
Japanese Patent Office, Decision of Rejection dated Feb. 5, 2013, as entered in related Japanese Application No. 2010-522953 (Japanese counterpart to U.S. Appl. No. 11/895,909) (3 pages).
Korean Intellectual Property Office, Notification of Provisional Rejection dated Apr. 19, 2013, as entered in related Korean Application No. 10-2012-7012538 (Korean counterpart to U.S. Appl. No. 12/896,307) (4 pages).
The Patent Office of the People's Republic of China; Notification of the Third Office Action dated Jun. 9, 2013, as entered in related Chinese Application No. 200880113529.7 (Chinese counterpart to U.S. Appl. No. 11/895,909) (7 pages).
Amendment, Response and Argument dated Jul. 31, 2013, as filed in related Japanese Patent Application No. 2010-522953 (Japanese counterpart to U.S. Appl. No. 11/895,909) (17 pages).
Korean Intellectual Property Office, Notification of Provisional Rejection dated Aug. 8, 2013, as entered in counterpart Korean Application No. 10-2011-7029409 (4 pages).
European Patent Office, Extended European Search Report (including Supplementary European Search Report and European Search Opinion) dated Jul. 31, 2013, as issued in connection with related European Patent Application No. 10822357.9 (European counterpart to U.S. Appl. No. 12/900,884) (9 pages).
U.S. Patent and Trademark Office; Office Action dated Oct. 2, 2013, as entered in related U.S. Appl. No. 12/900,884 (16 pages).
U.S. Patent and Trademark Office; Office Action dated Jan. 15, 2014, as entered in related U.S. Appl. No. 12/900,884 (10 pages).
U.S. Patent and Trademark Office; Office Action dated Jan. 28, 2014, as entered in related U.S. Appl. No. 13/019,867 (10 pages).
Japanese Patent Office; Notification of First Office Action dated Jan. 21, 2014, as entered in related Japanese Application No. 2012-260104 (document provides Japanese Patent Office's interpretation of several paragraphs of JP 2002-133568A) (3 pages).
U.S. Patent and Trademark Office; Office Action dated Jan. 29,2014, as entered in related U.S. Appl. No. 12/001,819 (21 pages).
International Search Report and Written Opinion dated Feb. 25, 2009 issued by the Korean Intellectual Property Office as International Searching Authority in connection with International Application No. PCT/US2008/010199 (7 pages).
Office Action dated Jul. 17, 2009, as entered in Parent U.S. Appl. No. 11/895,909 (11 pages).
Amendment and Response dated Oct. 15, 2009, as filed in Parent U.S. Appl. No. 11/895,909 (14 pages).
Notice of Allowability dated Dec. 23, 2009, as entered in Parent U.S. Appl. No. 11/895,909 (4 pages).
Office Action dated May 19, 2010, as entered in co-pending, related U.S. Appl. No. 12/715,195 (10 pages).
Amendment and Response dated Jul. 19, 2010 as filed in co-pending, related U.S. Appl. No. 12/715,195 (20 pages).
International Search Report and Written Opinion dated Jul. 15, 2010 issued by the United States Patent and Trademark Office as International Searching Authority in connection with International Application No. PCT/US10/01354 (10 pages).
International Search Report and Written Opinion dated Jul. 23, 2010 issued by the United States Patent and Trademark Office as International Searching Authority in connection with International Application No. PCT/US10/01489 (11 pages).
International Search Report and Written Opinion dated Mar. 6, 2009 issued by the United States Patent and Trademark Office as International Searching Authority in connection with related International Application No. PCT/US10/010200 (8 pages).
Michael Ahlheim and Friedrich Schneider; "Allowing for Household Preferences in Emission Trading, A Contribution to the Climate Policy Debate"; Environmental and Resource Economics, vol. 21, pp. 317-342; Kluwer Academic Publishers; The Netherlands; 2002.
Olivier Rousse; "Environmental and economic benefits resulting from citizens' participation in $CO_2$ emissions trading: An efficient alternative solution to the voluntary compensation of $CO_2$ emissions", Energy Policy 36 (2008), pp. 388-397; Oct. 29, 2007 (online).
Notice of Allowability dated Aug. 31, 2010, as entered in related U.S. Appl. No. 12/715,124 (5 pages).
B.J. Kirby, Spinning Reserve from Responsive Loads, Oak Ridge National Laboratory, United States Dept. of Energy, Mar. 2003 (54 pages).

(56) References Cited

OTHER PUBLICATIONS

Eric Hirst and Brendan Kirby, Opportunities for Demand Participation in New England Contingency-Reserve Markets, New England Demand Response Initiative, Feb. 2003 (15 pages).
Pablo A. Ruiz and Peter W. Sauer, Valuation of Reserve Services, IEEE Proceedings of the 41$^{st}$ Hawaii International Conference on System Sciences, 2008 (9 pages).
Eric Hirst and Richard Cowart, Demand Side Resources and Reliability, New England Demand Response Initiative, Mar. 20, 2002 (32 pages).
C.W. Gellings and W.M. Smith, Integrating Demand-Side Management into Utility Planning, Proceedings of the IEEE, vol. 77, Issue: 6, Jun. 1989, pp. 908-918 (Abstract only).
M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).
L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).
Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).
Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).
Office Action dated Jan. 7, 2011 as issued by the Australian Patent Office (Australian Government IP Australia) in connection with related Australian Application No. 2008296979 (2 pages).
Mashiro Inoue, Toshiyasu Higuma, Yoshiaki Ito, Noriyuki Kushiro and Hitoshi Kubota, Network Architecture for Home Energy Management System, IEEE Transactions on Consumer Electronics, vol. 49, Issue 3, Aug. 2003, pp. 606-613 (8 pages).
International Search Report and Written Opinion dated Nov. 30, 2010 issued by the Korean Intellectual Property Office as International Searching Authority in connection with related International Application No. PCT/US2010/034395 (8 pages).
International Search Report and Written Opinion dated Dec. 20, 2010 issued by the United States Patent and Trademark Office as International Searching Authority in connection with related International Application No. PCT/US10/02676 (20 pages).
International Search Report and Written Opinion dated Dec. 21, 2010 issued by the Korean Intellectual Property Office as International Searching Authority in connection with related International Application No. PCT/US2010/034247 (7 pages).
International Search Report and Written Opinion dated Dec. 22, 2010 issued by the Korean Intellectual Property Office as International Searching Authority in connection with related International Application No. PCT/US2010/034409 (7 pages).
International Search Report and Written Opinion dated Dec. 22, 2010 issued by the Korean Intellectual Property Office as International Searching Authority in connection with related International Application No. PCT/US2010/034418 (7 pages).
Notice of Allowability dated Sep. 8, 2010, as entered in related U.S. Appl. No. 12/715,195 (4 pages).
Paul Darbee, Insteon The Details, Smarthouse, Inc., Aug. 11, 2005, 68 pages.
Paul Darbee, Insteon Compared, SmartLabs, Inc., Jan. 2, 2006, 69 pages.
International Search Report and Written Opinion dated May 31, 2011 issued by the Korean Intellectual Property Office as International Searching Authority in connection with related International Application No. PCT/US2010/002709 (7 pages).
U.S. Patent and Trademark Office; Office Action dated Sep. 13, 2011 as entered in related U.S. Appl. No. 12/001,819 (18 pages).

The Patent Office of the People's Republic of China; Notification of the First Office Action dated Oct. 17, 2011, as entered in related Chinese Application No. 200880113530.X (9 pages).
The Patent Office of the People's Republic of China; Notification of the First Office Action dated Oct. 17, 2011, as entered in related Chinese Application No. 200880113529.7 (11 pages).
U.S. Patent and Trademark Office; Office Action dated Dec. 15, 2011, as entered in related U.S. Appl. No. 13/172,261 (8 pages).
U.S. Patent and Trademark Office; Office Action dated Feb. 6, 2012, as entered in related U.S. Appl. No. 13/172,389 (9 pages).
U.S. Patent and Trademark Office; Office Action dated Jan. 3, 2012, as entered in related U.S. Appl. No. 12/702,768 (9 pages).
U.S. Patent and Trademark Office; Notice of Allowability dated Jan. 25, 2012, as entered in related U.S. Appl. No. 12/702,640 (11 pages).
U.S. Patent and Trademark Office; Notice of Allowability dated Feb. 10, 2012, as entered in related U.S. Appl. No. 12/702,785 (10 pages).
U.S. Patent and Trademark Office; Office Action dated Mar. 9, 2012, as entered in related U.S. Appl. No. 12/783,415 (36 pages).
Amendment and Response dated Mar. 13, 2012 as filed in related U.S. Appl. No. 12/001,819 (21 pages).
Japanese Patent Office; Notification of First Office Action dated Mar. 21, 2012, as entered in related Japanese Application No. 2010522954 (10 pages).
Amendment and Response dated May 7, 2012, as filed in related U.S. Appl. No. 13/172,261 (30 pages).
Amendment and Response dated Apr. 2, 2012, as filed in related U.S. Appl. No. 12/702,768 (12 pages).
U.S. Patent and Trademark Office; Notice of Allowability dated May 2, 2012, as entered in related U.S. Appl. No. 12/702,768 (7 pages).
Amendment and Response dated May 7, 2012, as filed in related U.S. Appl. No. 13/172,389 (15 pages).
U.S. Patent and Trademark Office; Office Action dated May 18, 2012, as entered in related U.S. Appl. No. 12/001,819 (21 pages).
Response to Examination Report dated Jun. 5, 2012, as filed in related Australian Patent Application No. 2008296979 (33 pages).
European Patent Office, Extended European Search Report (including Supplementary European Search Report and European Search Opinion) dated May 29, 2012, as issued in connection with related European Patent Application No. 08795673.6 (7 pages).
European Patent Office, Extended European Search Report (including Supplementary European Search Report and European Search Opinion) dated Jun. 1, 2012, as issued in connection with related European Patent Application No. 08795674.4 (6 pages).
U.S. Patent and Trademark Office; Notice of Allowability dated Jun. 5, 2012, as entered in related U.S. Appl. No. 13/172,261 (4 pages).
International Search Report and Written Opinion dated Jun. 22, 2012 issued by the Korean Intellectual Property Office as International Searching Authority in connection with related International Application No. PCT/US2012/023488 (8 pages).
Patent Examination Report No. 3 dated Jul. 6, 2012 from the Australian Patent Office (Australian Government IP Australia) in connection with related Australian Application No. 2008296979 (4 pages).
Decision of Rejection issued Jul. 31, 2012 by the Japanese Patent Office in connection with related Japanese Application No. 2010-522953 (2 pages).
Amendment and Response dated Sep. 4, 2012, as filed in related U.S. Appl. No. 12/775,979 (7 pages).
Amendment and Response dated Sep. 10, 2012, as filed in related U.S. Appl. No. 12/783,415 (40 pages).
Mexican Institute of Industrial Property, Official Action dated Nov. 9, 2012, as entered in counterpart Mexican Application No. MX/a/2011/011824 (2 pages).
Korean Intellectual Property Office, Notification of Provisional Rejection dated Nov. 23, 2012, as entered in counterpart Korean Application No. 10-2011-7029409 (3 pages).
Korean Intellectual Property Office, Second Notification of Provisional Rejection dated Oct. 22, 2012, as entered in related Korean Application No. 10-2012-7001804 (1 page).
International Search Report and Written Opinion dated Oct. 30, 2012 issued by the Korean Intellectual Property Office as International Searching Authority in connection with related International Application No. PCT/US2012/029339 (13 pages).

(56) References Cited

OTHER PUBLICATIONS

Korean Intellectual Property Office, Second Notification of Provisional Rejection dated Oct. 31, 2012, as entered in counterpart Korean Application No. 10-2010-7006801 (5 pages).

The Patent Office of the People's Republic of China; Notification of the Second Office Action dated Oct. 29, 2012, as entered in related Chinese Application No. 200880113530.X (9 pages).

The Patent Office of the People's Republic of China; Notification of the Second Office Action dated Oct. 26, 2012, as entered in related Chinese Application No. 200880113529.7 (7 pages).

Mexican Institute of Industrial Property, Official Action dated May 14, 2014, as entered in related Mexican Application No. MX/a/2013/8834 (2 pages).

European Patent Office, Extended European Search Report (including Supplementary European Search Report and European Search Opinion) dated Jun. 19, 2014, as issued in connection with counterpart European Patent Application No. 10772388.4 (8 pages).

Association of Edison Illuminating Companies; Demand Response Measurement & Verification; Mar. 2009 (30 pages).

U.S. Patent and Trademark Office; Final Office Action dated Jul. 15, 2014, as entered in related U.S. Appl. No. 13/019,867 (11 pages).

U.S. Patent and Trademark Office; Final Office Action dated Jun. 12, 2014, as entered in related U.S. Appl. No. 12/001,819 (21 pages).

New Program: [          ]

Step 2: Manage Water Heater | Cancel Setup | Previous Step | Next Step

For this device when using this program . . .

At what state would you normally leave the device at when you wake up? ● ON ○ OFF At what state would you normally leave the device at when the first person in your household returns home? ● ON ○ OFF At what state would you normally leave the device at when no one is at home? ○ ON ● OFF At what state would you normally leave the device at when everyone is sleeping? ○ ON ● OFF Show Details

SYSTEM AND METHOD FOR ESTIMATING AND PROVIDING DISPATCHABLE OPERATING RESERVE ENERGY CAPACITY THROUGH USE OF ACTIVE LOAD MANAGEMENT

CROSS REFERENCE TO RELATED APPLICATIONS

This application is a division of U.S. application Ser. No. 12/775,979, filed on May 7, 2010, which application is incorporated herein by this reference as if fully set forth herein. Application Ser. No. 12/775,979 is a continuation-in-part of U.S. application Ser. No. 11/895,909 filed on Aug. 28, 2007, now U.S. Pat. No. 7,715,951, which application is incorporated herein by this reference as if fully set forth herein. Application Ser. No. 12/775,979 is also a continuation-in-part of co-pending U.S. application Ser. No. 12/001,819 filed on Dec. 13, 2007, which application is incorporated herein by this reference as if fully set forth herein. Finally, application Ser. No. 12/775,979 further claims priority under 35 U.S.C. §119(e) upon U.S. Provisional Application Ser. No. 61/215, 725 filed on May 8, 2009 solely to the extent of the subject matter disclosed in said provisional application, which application is incorporated herein by this reference as if fully set forth herein.

BACKGROUND OF THE INVENTION

1. Field of the Invention

The present invention relates generally to the field of electric power supply and generation systems and, more particularly, to a system and method for estimating and/or providing dispatchable operating reserve energy capacity for an electric utility using active load management so that the reserve capacity may be made available to the utility or to the general power market (e.g., via a national grid).

2. Description of Related Art

Energy demand within a utility's service area varies constantly. Such variation in demand can cause undesired fluctuations in line frequency if not timely met. To meet the varying demand, a utility must adjust its supply or capacity (e.g., increase capacity when demand increases and decrease supply when demand decreases). However, because power cannot be economically stored, a utility must regularly either bring new capacity on-line or take existing capacity off-line in an effort to meet demand and maintain frequency. Bringing new capacity online involves using a utility's reserve power, typically called "operating reserve." A table illustrating a utility's typical energy capacity is shown in FIG. 1. As shown, operating reserve typically includes three types of power: so-called "regulating reserve," "spinning reserve," and "non-spinning reserve" or "supplemental reserve." The various types of operating reserve are discussed in more detail below.

Normal fluctuations in demand, which do not typically affect line frequency, are responded to or accommodated through certain activities, such as by increasing or decreasing an existing generator's output or by adding new generating capacity. Such accommodation is generally referred to as "economic dispatch." A type of power referred to as "contingency reserve" is additional generating capacity that is available for use as economic dispatch to meet changing (increasing) demand. Contingency reserve consists of two of the types of operating reserve, namely, spinning reserve and non-spinning reserve. Therefore, operating reserve generally consists of regulating reserve and contingency reserve.

As shown in FIG. 1, spinning reserve is additional generating capacity that is already online (e.g., connected to the power system) and, thus, is immediately available or is available within a short period of time after a determined need (e.g., within ten (10) to fifteen (15) minutes, as defined by the applicable North American Electric Reliability Corporation (NERC) regulation). More particularly, in order for contingency reserve to be classified as "spinning reserve," the reserve power capacity must meet the following criteria:
 a) be connected to the grid;
 b) be measurable and verifiable; and
 c) be capable of fully responding to load typically within 10-15 minutes of being dispatched by a utility, where the time-to-dispatch requirements of the spinning reserve are generally governed by a grid system operator or other regulatory body, such as NERC.

Non-spinning reserve (also called supplemental reserve) is additional generating capacity that is not online, but is required to respond within the same time period as spinning reserve. Typically, when additional power is needed for use as economic dispatch, a power utility will make use of its spinning reserve before using its non-spinning reserve because (a) the generation methods used to produce spinning reserve capacity typically tends to be cheaper than the methods, such as one-way traditional demand response, used to produce non-spinning reserve or (b) the consumer impact to produce non-spinning reserve is generally less desirable than the options used to produce spinning reserve due to other considerations, such as environmental concerns. For example, spinning reserve may be produced by increasing the torque of rotors for turbines that are already connected to the utility's power grid or by using fuel cells connected to the utility's power grid; whereas, non-spinning reserve may be produced from simply turning off resistive and inductive loads such as heating/cooling systems attached to consumer locations. However, making use of either spinning reserve or non-spinning reserve results in additional costs to the utility because of the costs of fuel, incentives paid to consumers for traditional demand response, maintenance, and so forth.

If demand changes so abruptly and quantifiably as to cause a substantial fluctuation in line frequency within the utility's electric grid, the utility must respond to and correct for the change in line frequency. To do so, utilities typically employ an Automatic Generation Control (AGC) process or subsystem to control the utility's regulating reserve. To determine whether a substantial change in demand has occurred, each utility monitors its Area Control Error (ACE). A utility's ACE is equal to the difference in the scheduled and actual power flows in the utility grid's tie lines plus the difference in the actual and scheduled frequency of the supplied power multiplied by a constant determined from the utility's frequency bias setting. Thus, ACE can be written generally as follows:

$$ACE = (NI_A - NI_S) + (-10B_1)(F_A - F_S), \qquad \text{[Equation 1]}$$

where $NI_A$ is the sum of actual power flows on all tie lines,
 $NI_S$ is the sum of scheduled flows on all tie lines,
 $B_1$ is the frequency bias setting for the utility,
 $F_A$ is the actual line frequency, and
 $F_S$ is the scheduled line frequency (typically 60 Hz).

In view of the foregoing ACE equation, the amount of loading relative to capacity on the tie lines causes the quantity $(NI_A - NI_S)$ to be either positive or negative. When demand is greater than supply or capacity (i.e., the utility is under-generating or under-supplying), the quantity $(NI_A - NI_B)$ is negative, which typically causes ACE to be negative. On the other hand, when demand is less than supply, the quantity ($NI_A$–$NI_S$) is positive (i.e., the utility is over-generating or over-supplying), which typically causes ACE to be positive. The amount of demand (e.g., load) or capacity directly affects the quantity ($NI_A$–$NI_S$); thus, ACE is a measure of generation capacity relative to load. Typically, a utility attempts to maintain its ACE very close zero using AGC processes.

If ACE is not maintained close to zero, line frequency can change and cause problems for power consuming devices attached to the electric utility's grid. Ideally, the total amount of power supplied to the utility tie lines must equal the total amount of power consumed through loads (power consuming devices) and transmission line losses at any instant of time. However, in actual power system operations, the total mechanical power supplied by the utility's generators is seldom exactly equal to the total electric power consumed by the loads plus the transmission line losses. When the power supplied and power consumed are not equal, the system either accelerates (e.g., if there is too much power in to the generators) causing the generators to spin faster and hence to increase the line frequency or decelerates (e.g., if there is not enough power into the generators) causing the line frequency to decrease. Thus, variation in line frequency can occur due to excess supply, as well as due to excess demand.

To respond to fluctuations in line frequency using AGC, a utility typically utilizes "regulating reserve," which is one type of operating reserve as illustrated in FIG. 1. Regulating reserve is used as needed to maintain constant line frequency. Therefore, regulating reserve must be available almost immediately when needed (e.g., in as little as a few seconds to less than about five (5) minutes). Governors are typically incorporated into a utility's generation system to respond to minute-by-minute changes in load by increasing or decreasing the output of individual generators and, thereby, engaging or disengaging, as applicable, the utility's regulating reserve.

The Federal Energy Reliability Commission (FERC) and NERC have proposed the concept of Demand Side Management (DSM) as an additional approach to account for changes in demand. DSM is a method in which a power utility carries out actions to reduce demand during peak periods. Examples of DSM include encouraging energy conservation, modifying prices during peak periods, direct load control, and others.

Current approaches for using DSM to respond to increases in demand have included using one way load switches that interrupt loads, as well as statistics to approximate the average amount of projected load removed by DSM. A statistical approach is employed because of the utility's inability to measure the actual load removed from the grid as a result of a DSM load control event. In addition, current DSM approaches have been limited to use of a single power measuring meter among every one hundred (100) or more service points (e.g., residences and/or businesses). Accordingly, current DSM approaches are inadequate because they rely on statistical trends and sampling, rather than on empirical data, to make projections and measure actual load removal events.

More recently, FERC and NERC have introduced the concept of flexible load-shape programs as a component of DSM. These programs allow customers to make their preferences known to the utility concerning timing and reliability of DSM load control events. However, DSM approaches utilizing load-shaping programs do not meet all of the criteria for implementing regulating reserve or spinning reserve, such as being dispatchable within 15 minutes or less. Additionally, in order for a generating source to be considered dispatchable energy, it must be forecasted twenty-four (24) hours prior to being delivered to a utility. Current DSM approaches do not facilitate accurate forecasting twenty-four (24) hours in advance due to their heavy reliance on statistics.

Therefore, there is a need for utilities to be able to create operating reserve, especially regulating and/or spinning reserve, by using accurate forecasting and flexible load shaping techniques. There is a further need to involve the consumer in a two-way approach in which the consumer can make their energy consumption preferences known and the utility can make use of those preferences to respond to increased demand and maintain line frequency regulation.

BRIEF DESCRIPTION OF THE DRAWINGS

FIG. 7 is a screen shot of an exemplary web browser interface through which a customer may designate his or her device performance and energy saving preferences for an environmentally-independent, power consuming device in accordance with another embodiment of the present invention.

DETAILED DESCRIPTION

Figure 1:
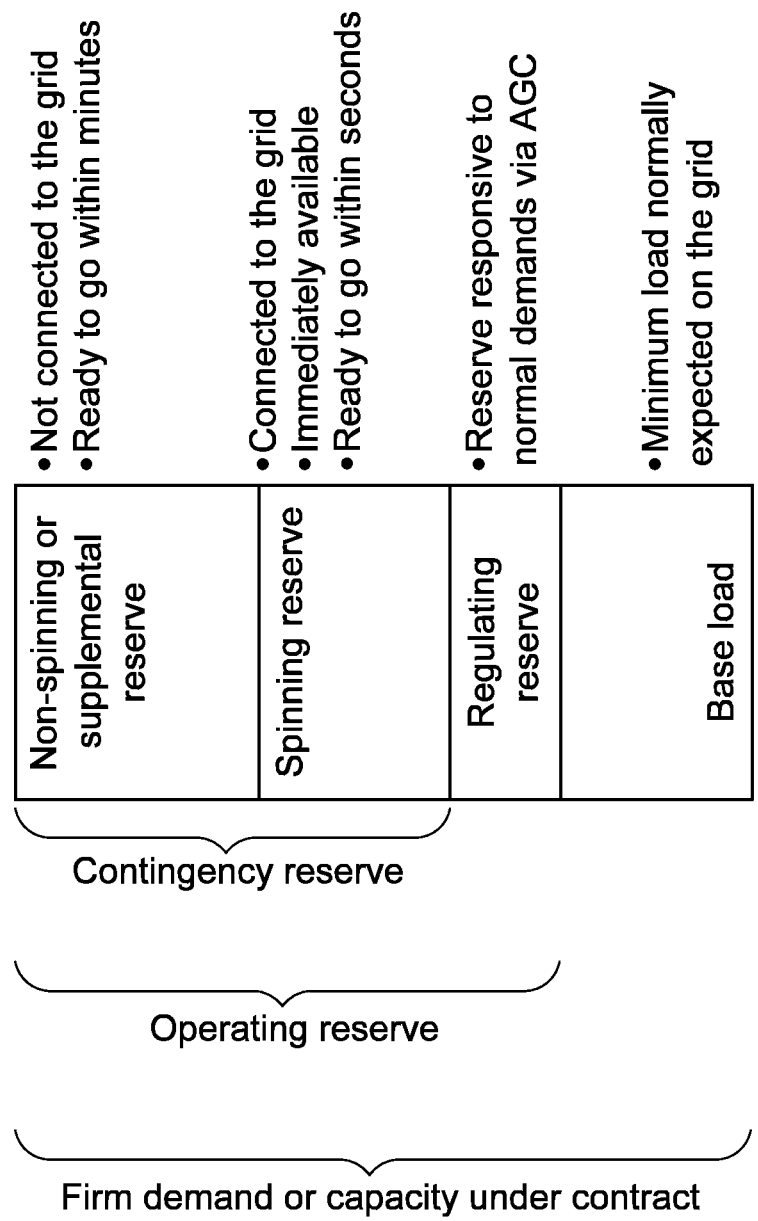
FIG. 1 is a table showing the base load power requirements and operating reserve available to an electric power utility.

Before describing in detail exemplary embodiments that are in accordance with the present invention, it should be observed that the embodiments reside primarily in combinations of apparatus components and processing steps related to actively monitoring and managing power loading at an individual service point (e.g., on an individual subscriber basis) and throughout a utility's service area, as well as determining available or dispatchable operating reserve power derived from projected power savings resulting from monitoring and management of power loading. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," and any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

Additionally, the term "ZigBee" refers to any wireless communication protocol adopted by the Institute of Electronics & Electrical Engineers (IEEE) according to standard 802.15.4 or any successor standard(s), and the term "Bluetooth" refers to any short-range communication protocol implementing IEEE standard 802.15.1 or any successor standard(s). The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

The terms "utility," "electric utility," "power utility," and "electric power utility" refer to any entity that generates and/or distributes electrical power to its customers, that purchases power from a power-generating entity and distributes the purchased power to its customers, or that supplies electricity created either actually or virtually by alternative energy sources, such as solar power, wind power, load control, or otherwise, to power generation or distribution entities through the FERC electrical grid or otherwise. The terms "energy" and "power" are used interchangeably herein. The terms "operating reserve," "spinning reserve," "regulating reserve," "non-spinning reserve," "supplemental reserve," and "contingency reserve" are conventional in the art and their uses and inter-relations are described in Paragraphs [0005]-[0008] and [0012] above. The term "environment" refers to general conditions, such as air temperature, humidity, barometric pressure, wind speed, rainfall quantity, water temperature, etc., at or proximate a service point or associated with a device (e.g., water temperature of water in a hot water heater or a swimming pool). The term "device," as used herein, means a power-consuming device, and there may generally be two different types of devices within a service point, namely, an environmentally-dependent device and an environmentally-independent device. An environmentally-dependent device is any power consuming device that turns on or off, or modifies its behavior, based on one or more sensors that detect characteristics, such as temperature, humidity, pressure, or various other characteristics, of an environment. An environmentally-dependent device may directly affect and/or be affected by the environment in which it operates. An environmentally-independent device is any power-consuming device that turns on or off, or modifies its behavior, without reliance upon inputs from any environmental sensors. Generally speaking, an environmentally-independent device does not directly affect, and is not typically affected by, the environment in which it operates, although, as one skilled in the art will readily recognize and appreciate, operation of an environmentally-independent device can indirectly affect, or occasionally be affected by, the environment. For example, as those skilled in the art readily understand, a refrigerator or other appliance generates heat during operation, thereby causing some heating of the ambient air proximate the device.

It will be appreciated that embodiments or components of the systems described herein may be comprised of one or more conventional processors and unique stored program instructions that control the one or more processors to implement, in conjunction with certain non-processor circuits, some, most, or all of the functions for determining an electric utility's available or dispatchable operating (e.g., regulating and spinning) reserve that is derived from projected power savings resulting from monitoring and management of loads in one or more active load management systems as described herein. The non-processor circuits may include, but are not limited to, radio receivers, radio transmitters, antennas, modems, signal drivers, clock circuits, power source circuits, relays, meters, memory, smart breakers, current sensors, and user input devices. As such, these functions may be interpreted as steps of a method to store and distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the foregoing approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Generally, the present invention encompasses a system and method for estimating operating reserve (e.g., spinning and/or regulating reserve) for a utility servicing one or more service points. In one embodiment, the utility employs an active load management system (ALMS) to remotely determine, during at least one period of time, power consumed by at least one device located at the one or more service points and receiving power from the utility to produce power consumption data. The power consumption data is regularly stored and updated in a repository. The ALMS or a control component thereof, such as an active load director (ALD), determines an expected, future time period for a control event during which power is to be interrupted or reduced to one or more devices. Prior to commencement of the control event, the ALMS or its control component: (i) estimates power consumption behavior expected of the device(s) during the time period of the control event based at least on the stored power consumption data, (ii) determines projected energy savings resulting from the control event based at least on the estimated power consumption behavior of device(s), and determines operating (e.g., regulating and/or spinning) reserve based on the projected energy savings. The determined operating reserve may be made available to the current power utility or to the power market through the existing (e.g., Federal Energy Regulatory Commission) power grid. In one embodiment, the ALD populates an internal repository (e.g., database, matrix, or other storage medium) with measurement data indicating how individual devices within individual service points consume power or otherwise behave under normal operation and during control events. The power consumption data is updated through regular (e.g., periodic or otherwise) sampling of device operating conditions (e.g., current draw, duty cycle, operating voltage, etc.). When an ALD is first installed in an ALMS for an electric utility power grid, there is little data with which to create regulating and spinning reserve forecasts. However, over time, more and more data samples are used to improve the quality of the data in the repository. This repository is used to project both energy usage and energy savings. These projections can be aggregated for an entire service point, a group of service points, or the entire utility.

In an alternative embodiment, additional data may be used to help differentiate each data sample stored in the repository. The additional data is associated with variability factors, such as, for example, outside air temperature, day of the week, time of day, humidity, sunlight, wind speed, altitude, orientation of windows or doors, barometric pressure, energy efficiency rating of the service point, insulation used at the service point, and others. All of these variability factors can have an influence on the power consumption of a device. Some of the variability factor data may be obtained from public sources, such as local, state or national weather services, calendars, and published specifications. Other variability factor data may be obtained privately from user input and from sensors, such as humidity, altitude, temperature (e.g., a thermostat), and optical or light sensors, installed at or near a service point (e.g., within or at a residence or business).

Figure 2:
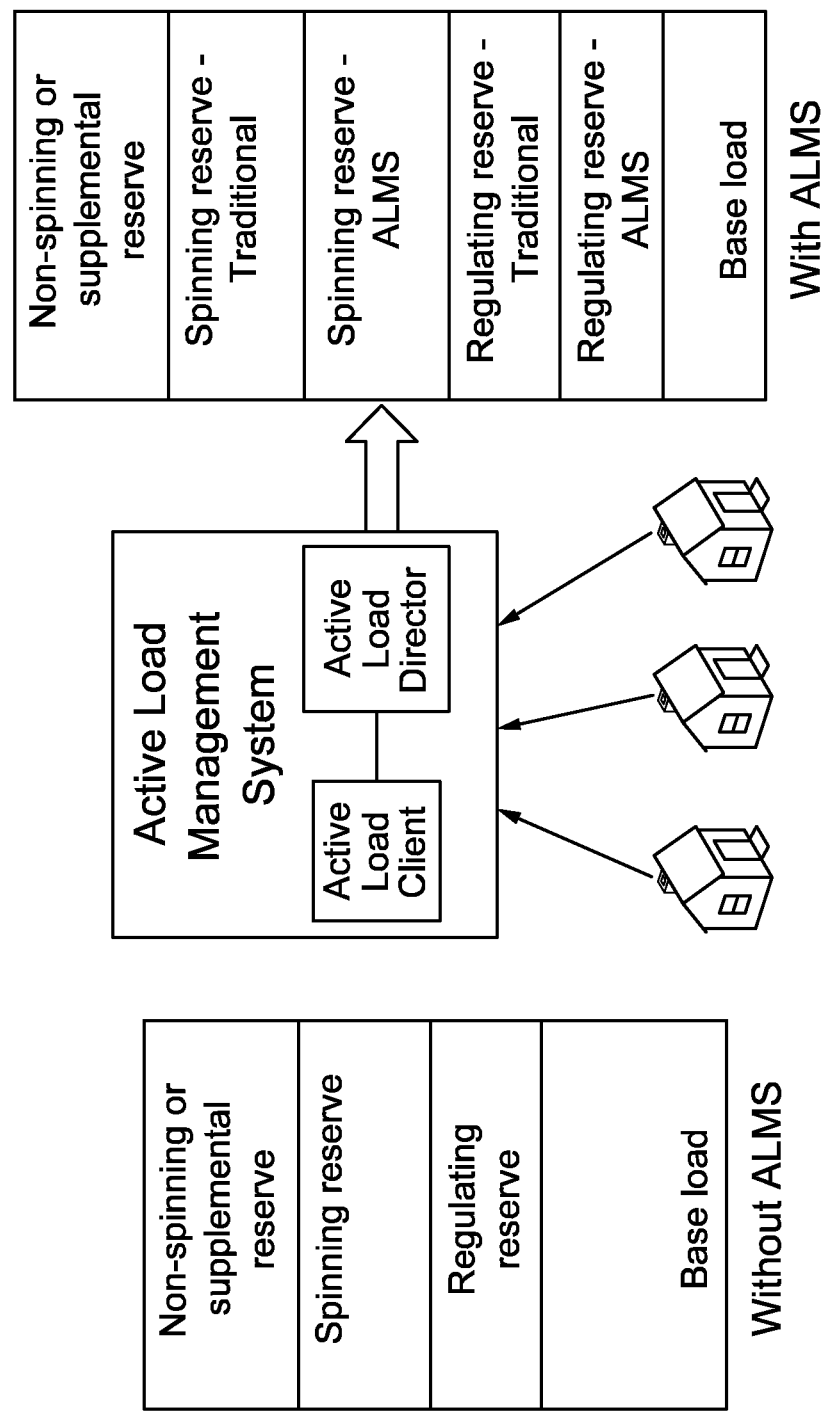
FIG. 2 is a block diagram illustrating how an active load management system in accordance with the present invention provides additional operating (e.g., regulating, spinning and/or non-spinning) reserve to a power utility.

FIG. 2 is a block diagram illustrating how an ALMS operating in accordance with the present invention provides additional operating (e.g., regulating, spinning, and/or non-spinning) reserve to a power utility. Without use of an ALMS operating in accordance with the present invention, the utility has capacity equal to its base load plus its regulating reserve, spinning reserve, and non-spinning reserve as shown on the left side of the figure. However, with use of an ALMS operating in accordance with the present invention, the utility has additional operating reserve, which may be preferably used as regulating, spinning and/or non-spinning reserve (as illustrated in FIG. 2), by drawing power selectively from service points through the interruption or reduction of power to devices, such as air conditioners, furnaces, hot water heaters, pool pumps, washers, dryers, boilers, and/or any other inductive or resistive loads, at the service points.

Figure 3:
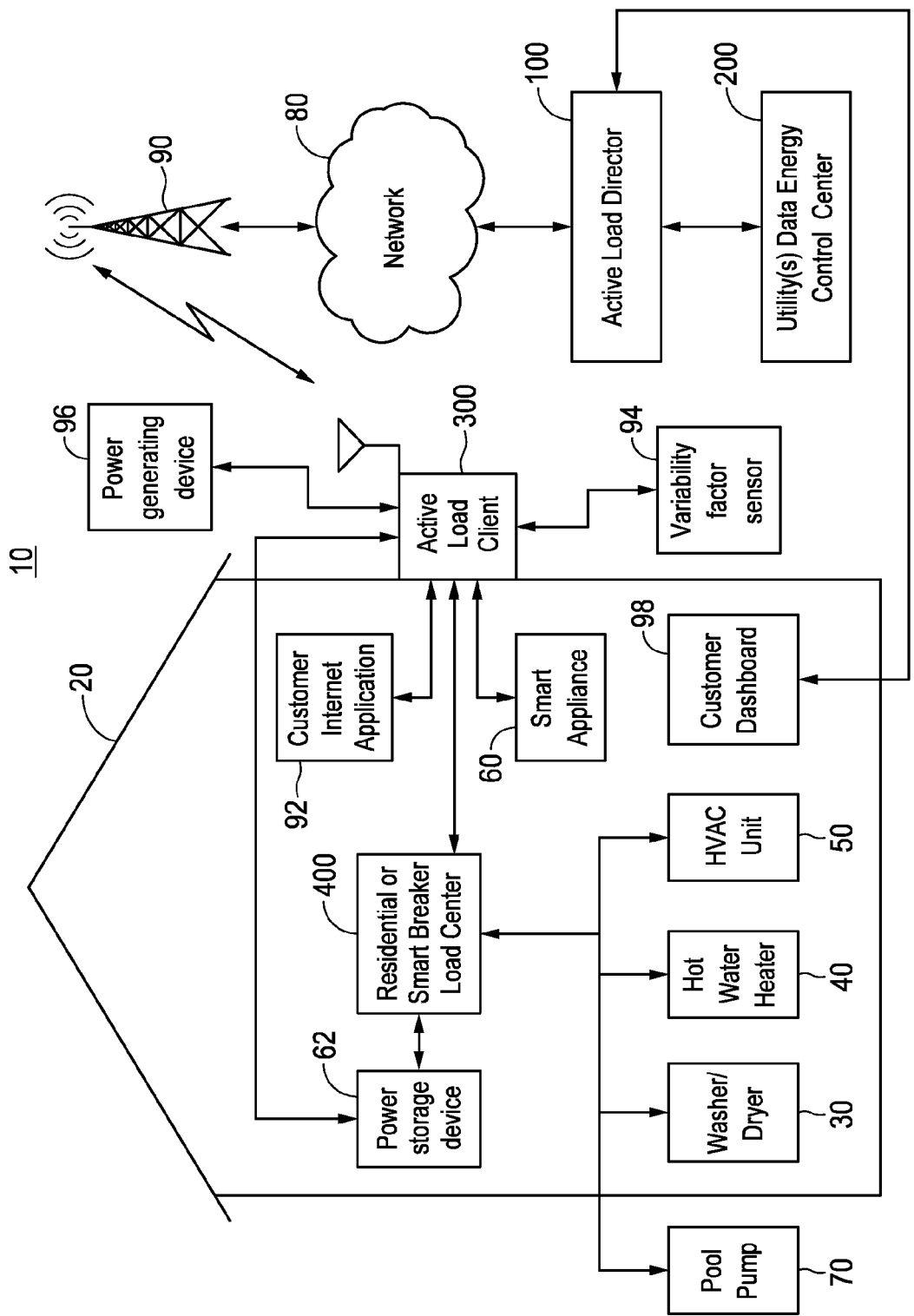
FIG. 3 is a block diagram of an exemplary IP-based, active load management system in accordance with one embodiment of the present invention.

The present invention can be more readily understood with reference to FIGS. 3-12, in which like reference numerals designate like items. FIG. 3 depicts an exemplary IP-based active load management system (ALMS) 10 that may be utilized by an electric utility, which may be a conventional power-generating utility or a virtual utility, in accordance with the present invention. The below description of the ALMS 10 is limited to specific disclosure relating to embodiments of the present invention. A more general and detailed description of the ALMS 10 is provided in commonly-owned, co-pending U.S. application Ser. No. 11/895,909, which was filed on Aug. 28, 2007, was published as U.S. Patent Application Publication No. US 2009/0062970 A1 on Mar. 5, 2009, and is incorporated herein by this reference as if fully set forth herein. U.S. Patent Application Publication No. US 2009/0062970 A1 provides details with respect to the exemplary operational implementation and execution of control events to interrupt or reduce power to devices located at service points, such as residences and businesses. The use of an ALMS 10 to implement a virtual utility is described in detail in commonly-owned and co-pending U.S. application Ser. No. 12/001,819, which was filed on Dec. 13, 2007, was published as U.S. Patent Application Publication No. US 2009/0063228 A1 on Mar. 5, 2009, and is incorporated herein by this reference as if fully set forth herein.

The ALMS 10 monitors and manages power distribution via an active load director (ALD) 100 connected between one or more utility control centers (UCCs) 200 (one shown) and one or more active load clients (ALCs) 300 (one shown) installed at one or more service points 20 (one exemplary residential service point shown). The ALD 100 may communicate with the utility control center 200 and each active load client 300 either directly or through a network 80 using the Internet Protocol (IP) or any other (IP or Ethernet) connection-based protocols. For example, the ALD 100 may communicate using RF systems operating via one or more base stations 90 (one shown) using one or more wireless communication protocols, such as GSM, ANSI C12.22, Enhanced Data GSM Environment (EDGE), HSPA, LTE, Time Division Multiple Access (TDMA), or CDMA data standards, including CDMA 2000, CDMA Revision A, CDMA Revision B, and CDMA EVDO Rev. A. Alternatively, or additionally, the ALD 100 may communicate via a digital subscriber line (DSL) capable connection, cable television based IP capable connection, or any combination thereof. In the exemplary embodiment shown in FIG. 3, the ALD 100 communicates with one or more active load clients 300 using a combination of traditional IP-based communication (e.g., over a trunked line) to a base station 90 and a wireless channel implementing the HSPA or EVDO protocol from the base station 90 to the active load client 300. The distance between the base station 90 and the service point 20 or the active load client 300 is typically referred to as the "last mile" even though the distance may not actually be a mile. The ALD 100 may be implemented in various ways, including, but not limited to, as an individual server, as a blade within a server, in a distributed computing environment, or in other combinations of hardware and software. In the following disclosure, the ALD 100 will be described as embodied in an individual server to facilitate an understanding of the present invention. Thus, the server embodiment of the ALD 100 described below corresponds generally to the description of the ALD 100 in US Patent Application Publication Nos. US 2009/0062970 A1 and US 2009/0063228 A1.

Each active load client 300 is preferably accessible through a specified address (e.g., IP address) and controls and monitors the state of individual smart breaker modules or intelligent appliances 60 installed at the service point 20 (e.g., in the business or residence) to which the active load client 300 is associated (e.g., connected or supporting). Each active load client 300 is preferably associated with a single residential or commercial customer. In one embodiment, the active load client 300 communicates with a residential load center 400 that contains smart breaker modules, which are able to switch from an "ON" (active) state to an "OFF" (inactive) state, and vice versa, responsive to signaling from the active load client 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance (e.g., a washer/dryer 30, a hot water heater 40, an HVAC unit 50, or a pool pump 70). In an alternative embodiment, IP addressable relays or device controllers that operate in a manner similar to a "smart breaker" may be used in place of smart breakers, but would be installed coincident with the load under control and would measure the startup power, steady state power, power quality, duty cycle and energy load profile of the individual appliance 60, HVAC unit 40, pool pump 70, hot water heater 40, or any other controllable load as determined by the utility or end customer.

Additionally, the active load client 300 may control individual smart appliances directly (e.g., without communicating with the residential load center 400) via one or more of a variety of known communication protocols (e.g., IP, Broadband over PowerLine (BPL) in its various forms, including through specifications promulgated or being developed by the HOMEPLUG Powerline Alliance and the Institute of Electrical and Electronic Engineers (IEEE), Ethernet, Bluetooth, ZigBee, Wi-Fi (IEEE 802.11 protocols), HSPA, EVDO, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, the smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

The active load client 300 may further be coupled to one or more variability factor sensors 94. Such sensors 94 may be used to monitor a variety of variability factors affecting operation of the devices, such as inside and/or outside temperature, inside and/or outside humidity, time of day, pollen count, amount of rainfall, wind speed, and other factors or parameters.

Figure 4:
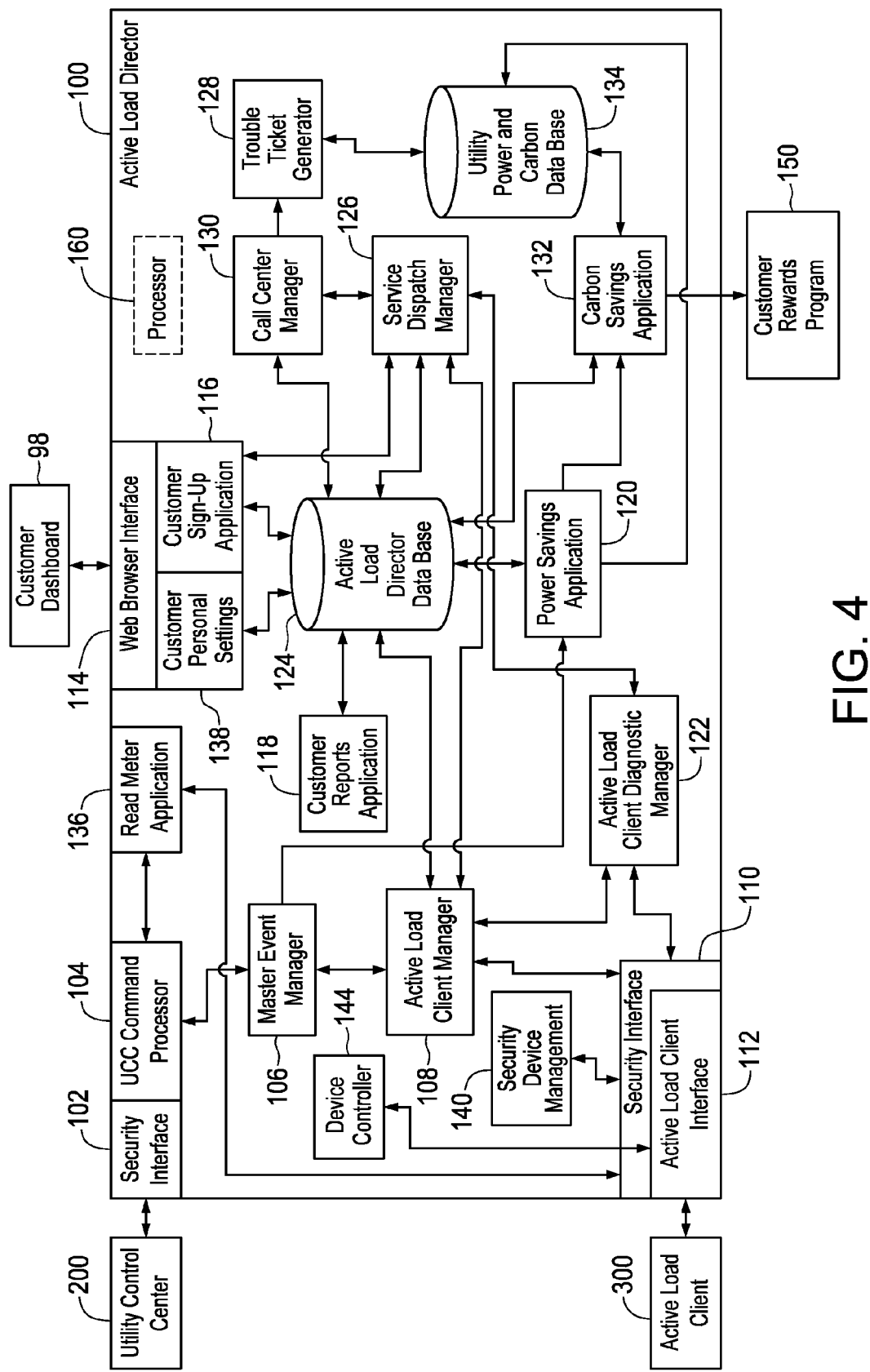
FIG. 4 is a block diagram illustrating an exemplary active load director as shown in the power load management system of FIG. 3.

Referring now to FIG. 4, the ALD 100 may serve as the primary interface to customers, as well as to service personnel, and operates as the system controller sending control messages to, and collecting data from, installed active load clients 300 as described in detail below and in U.S. Patent Application Publication No. US 2009/0062970 A1. In the exemplary embodiment depicted in FIG. 4, the ALD 100 is implemented as an individual server and includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon (P&C) database 134, a read meter application 136, a security device manager 140, a device controller 144, and one or more processors 160 (one shown). The operational details of several of the elements of the ALD 100 are described below with respect to their use in connection with the present invention. The operational details of the remaining elements of the ALD 100 may be found in U.S. Patent Application Publication Nos. US 2009/0062970 A1 and US 2009/0063228 A1, wherein the ALD 100 is also described in the context of an individual server embodiment.

Figures 5, 6:
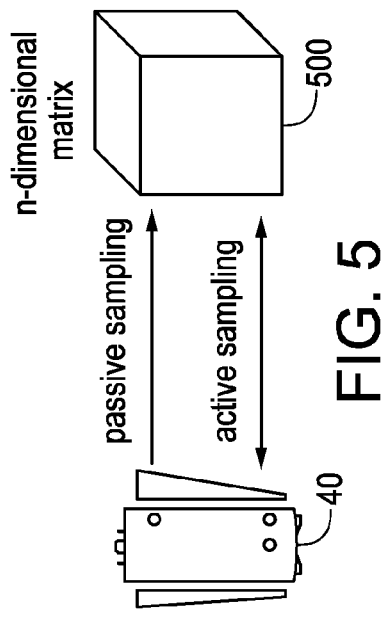
FIG. 5 is a block diagram illustrating generation of an exemplary sampling repository at the active load director of FIG. 4 or some other location in an electric utility.
FIG. 6 is a screen shot of an exemplary web browser interface through which a customer may designate his or her device performance and energy saving preferences for an environmentally-dependent, power consuming device in accordance with one embodiment of the present invention.

In one embodiment, a sampling repository is used to facilitate the determination of dispatchable operating reserve power or energy (e.g., spinning and/or regulating reserve) for a utility. An exemplary sampling repository 500 is shown in block diagram form in FIG. 5. As illustrated in FIG. 5, the sampling repository 500 is a means for storing device monitoring data and other data that collectively details how devices (e.g., a hot water heater 40 as shown in FIG. 5) have behaved under specific conditions. The repository 500 may be in various forms, including a matrix, a database, etc. In one embodiment, the sampling repository 500 is implemented in the ALD database 124 of the ALD 100. Alternatively, the sampling repository 500 may reside elsewhere within the ALD 100 or be external to the ALD 100. The sampling repository 500 contains all power consumption data for devices located at a device or service point 20 or within a utility. Power consumption data may include, but is not limited to: current reading, energy/power used or consumed, energy/power saved, drift or drift rate, power time, user settings for maximum environmental variances, time periods (e.g., hours of the day, days of the week, and calendar days). Taken collectively, this data is used to show how devices behaved during normal operation as well as during control events in which power is temporarily interrupted or reduced to one or more devices. The data may be obtained via passive sampling (e.g., regular monitoring of devices at a particular service point 20 by the active load client 300 associated with the service point 20) and/or active sampling (e.g., direct polling of the devices for the data by the active load client 300 or the ALD 100). As discussed below, the sampling repository 500 is used by the ALD 100 or other components of the ALMS 10 to estimate or project power consumption behavior of the devices and to determine projected power/energy savings resulting from a control event. The projected power savings may be determined using the power savings application 120 based upon the power consumption data in the repository 500.

FIG. 6 is an exemplary screen shot displayed to a user (e.g., customer) during execution of a customer personal settings application 138. The illustrated screen shot shows a screen being used to set the customer preferences for an environmentally-dependent device, such as an HVAC unit 50, a humidifier, or a pool heater. The illustrated screen shot may be provided to the customer in one embodiment via an Internet-accessible web portal 98 (referred to herein as the "customer dashboard") when such portal is accessed by the customer via a computer, smart phone, or other comparable device. As shown in FIG. 3, the customer dashboard 98 may be connected to the ALD 100 via an Internet service provider for the service point 20 or may be implemented as a customer Internet application 92 when Internet service is supplied through the active load client 300 as described in U.S. Patent Application Publication No. US 2009/0063228 A1. The customer dashboard 98 effectively provides the customer with access into the ALD 100. The ALD's web browser interface 114 accepts inputs from the customer dashboard 98 and outputs information to the customer dashboard 98 for display to the customer. The customer dashboard 98 may be accessed from the service point 20 or remotely from any Internet-accessible device, preferably through use of a user name and password. Thus, the customer dashboard 98 is preferably a secure, web-based interface used by customers to specify preferences associated with devices controlled by the ALD 100 and located at the customer's service point 20, as well as to provide information requested by the customer personal settings application 138 or the customer sign-up application 116 in connection with controlled devices and/or service point conditions or parameters. Customer preferences may include, for example, control event preferences (e.g., times, durations, etc.), bill management preferences (e.g., goal or target for maximum monthly billing cost), maximum and minimum boundary settings for environmental characteristics, and others.

FIG. 7 is another exemplary screen shot displayed to a customer via the customer dashboard 98 during execution of a different portion of the customer personal settings application 138. FIG. 7 shows how customer preferences could be set for an environmentally-independent device, such as a hot water heater 40, a pool pump 70, or a sprinkler system water pump (which may also be an environmentally-dependent device if it includes, for example, a rainfall sensor). Using the web browser interface 114, customers interact with the ALD 100 and specify customer personal settings 138 that are recorded by the ALD 100 and stored in the ALD database 124 or other repository 500. The personal settings 138 may specify time periods during which load control events are permitted, time periods during which load control events are prohibited, maximum allowable variances for an operating environment at a particular service point 20 (e.g., maximum and minimum temperature and/or humidity), normal operating conditions of devices at different times of day, and other personal preferences related to operation of devices under the control of the ALD 100 through the active load client 300 at the service point 20.

As alluded to above, the present invention optionally tracks and takes into account the "drift" of an environmentally-dependent device. Drift occurs when the environmental characteristic(s) (e.g., temperature) monitored by an environmentally-dependent device begins to deviate (e.g., heat up or cool down) from a set point that is to be maintained by the environmentally-dependent device. Such deviation or drift may occur both normally and during control events. Thus, drift is the time it takes for the monitored environmental characteristic to move from a set point to an upper or lower comfort boundary when power, or at least substantial power, is not being consumed by the device. In other words, drift is a rate of change of the monitored environmental characteristic from a set point without use of significant power (e.g., without powering an HVAC unit compressor, but while continuing to power an associated digital thermostat and HVAC unit control system). One of ordinary skill in the art will readily appreciate that devices, such as HVAC units 50, which control one or more environmental characteristics at a service point 20, are also influenced or affected by the environment at the service point 20 because their activation or deactivation is based on one or more sensed environmental characteristics at the service point 20. For example, an HVAC unit 50 in cooling mode that attempts to maintain an inside temperature of 77° F. activates when the inside temperature is some temperature greater than 77° F. and, therefore, is influenced or affected by the environment in which the HVAC unit 50 operates.

The inverse of drift is "power time," which is the time it takes for the sensed environmental characteristic to move from a comfort boundary to a set point when significant or substantial power is being supplied to the environmentally-dependent device. In other words, "power time" is a rate of change of the monitored environmental characteristic from a comfort boundary to a set point with significant use of power. Alternatively, "drift" may be considered the time required for the monitored environmental characteristic to move to an unacceptable level after power is generally turned off to an environmentally-dependent device. By contrast, "power time" is the time required for the monitored environmental characteristic to move from an unacceptable level to a target level after power has been generally supplied or re-supplied to the environmentally-dependent device.

The power consumption data for an environmentally-dependent device, which may be gathered actively or passively as described above, may be used to empirically determine the drift and power time (rate of change, temperature slope, or other dynamic equation (f{x})) that defines an environmental characteristic's variation at a service point 20, or at least within the operating area of the environmentally-dependent device, so as to permit the determination of a uniquely derived "fingerprint" or power usage/consumption pattern or behavior for the service point 20 or the environmentally-dependent device.

Customers define the upper and lower boundaries of comfort by inputting customer preferences 138 through the web browser interface 114, with the set point optionally being in the middle of those boundaries. During normal operation, an environmentally-dependent device will attempt to keep the applicable environmental characteristic or characteristics near the device's set point or set points. However, all devices, whether environmentally-dependent or environmentally-independent, have a duty cycle that specifies when the device is in operation because many devices are not continuously in operation. For an environmentally-dependent device, the duty cycle ends when the environmental characteristic(s) being controlled reaches the set point (or within a given tolerance or variance of the set point). After the set point has been reached, the environmentally-dependent device is generally turned off and the environmental characteristic is allowed to "drift" (e.g., upward or downward) toward a comfort boundary. Once the environmental characteristic (e.g., temperature) reaches the boundary, the environmentally-dependent device is generally activated or powered on again until the environmental characteristic reaches the set point, which ends the duty cycle and the power time.

Drift may also occur during a control event. A control event is an action that temporarily reduces, terminates, or otherwise interrupts the supply of power to a device. During a control event, the environmental characteristic (e.g., temperature) monitored and/or controlled by an environmentally-dependent device will drift toward a comfort boundary (e.g., upper or lower) until the environmental characteristic reaches that boundary. Once the environmental characteristic reaches the boundary, the ALMS 10 generally returns or increases power to the device to enable the environmental characteristic to reach the set point again.

For example, an HVAC unit 50 may have a set point of 72° F. and minimum and maximum comfort boundary temperatures of 68° F. and 76° F., respectively. On a cold day, a control event may interrupt power to the HVAC unit 50 causing the monitored temperature within the service point 20 to move toward the minimum comfort boundary temperature. Once the monitored temperature inside the service point 20 reaches the minimum comfort boundary temperature, the control event would end, and power would be restored or increased to the HVAC unit 50, thus causing the monitored temperature to rise toward the set point. A similar, but opposite effect, may take place on a warm day. In this example, "drift" is the rate of change with respect to the time it takes the HVAC unit 50 to move from the set point to either the upper or lower comfort bounds. Analogously, "power time" is the rate of change with respect to the time required for the HVAC unit 50 to move the monitored temperature from the upper or lower comfort bounds to the set point. In one embodiment of the present invention, drift and power time are calculated and recorded for each environmentally-dependent or environmentally-independent device or for each service point 20.

In another embodiment, drift and other measurement data available from the ALD database 124 are used to create a power consumption behavior or pattern for each environmentally-dependent or environmentally-independent device or for each service point 20. The other measurement data may include vacancy times, sleep times, times in which control events are permitted, and/or other variability factors.

The environment within an energy-efficient structure will have a tendency to exhibit a lower rate of drift. Therefore, environmentally-dependent devices operating within such structures may be subject to control events for longer periods of time because the amount of time taken for the monitored environmental characteristic to reach a comfort boundary due to drift after being set to a set point is longer than for less efficient structures.

In another embodiment, the ALD 100 may identify service points 20 that have an optimum drift for power savings. The power savings application 120 calculates drift for each service point 20 and/or for each environmentally-dependent device at the service point 20, and saves the drift information in the ALD database 124 as part of power consumption data for the device and/or the service point 20. Thus, power saved as a result of drift during a control event increases overall power saved by the environmentally-dependent device at the service point 20.

Figure 8:
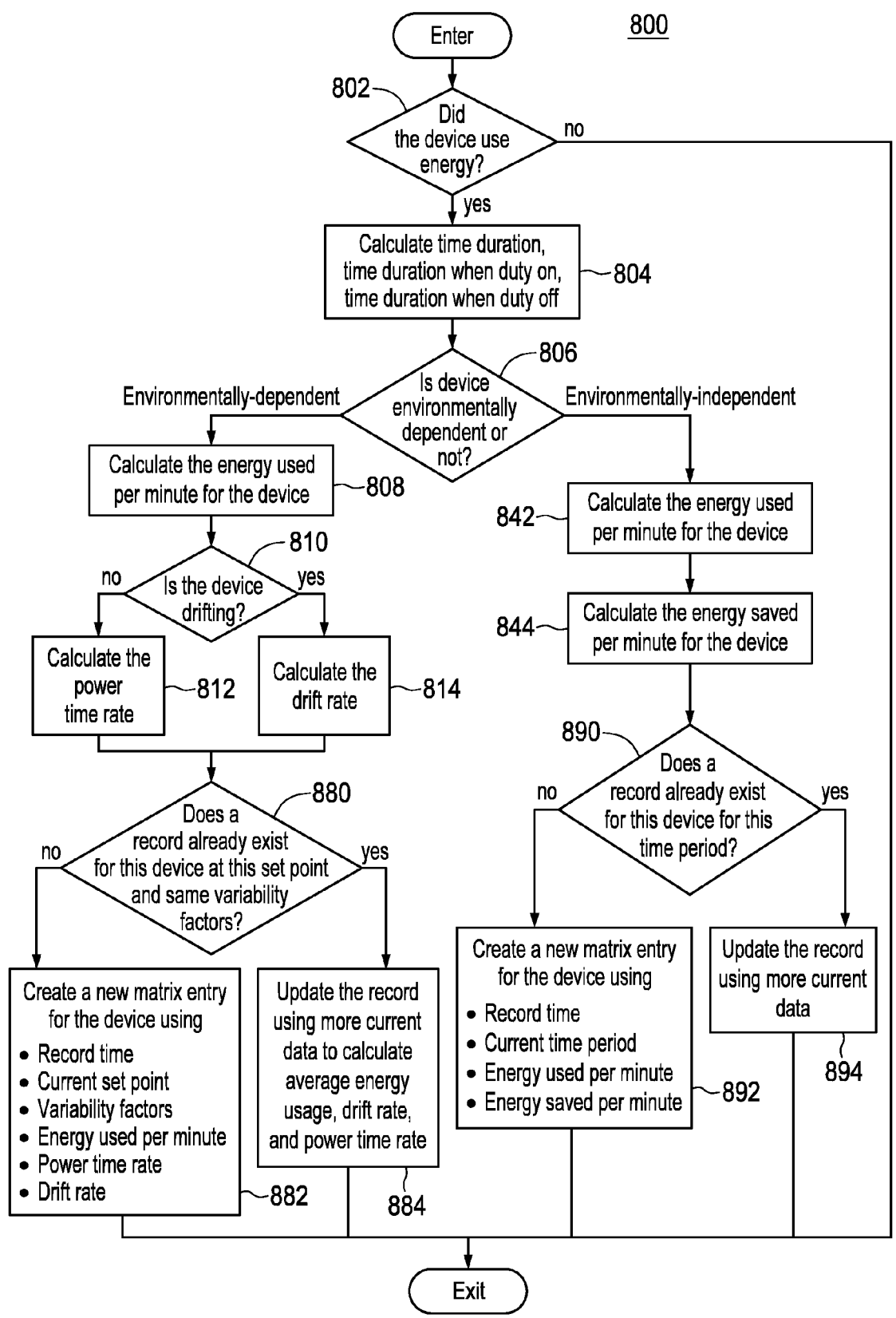
FIG. 8 is an operational flow diagram illustrating a method for empirically analyzing power usage of power consuming devices and populating a repository with data samples resulting from such power usage analysis, in accordance with an exemplary embodiment of the present invention.

FIG. 8 illustrates an exemplary operational flow diagram 800 providing steps executed by the ALD 100 to empirically analyze power usage of devices and populate a repository 500 with data samples resulting from such power usage analysis, in accordance with one embodiment of the present invention. The steps in FIG. 8 may be considered to implement a passive sampling algorithm. The steps of FIG. 8 are preferably implemented as a set of computer instructions (software) stored in memory (not shown) of the ALD 100 and executed by one or more processors 160 of the ALD 100.

According to the logic flow, the active load client 300 polls devices within the service point 20, such as a washer/dryer 30, hot water heater 40, HVAC unit 50, smart appliance 60, pool pump 70, or other devices within the service point 20, and obtains current readings. Upon receiving the current reading data from the active load client 300, the ALC interface 112 sends the data to the ALC manager 108. The ALC manager 108 stores the data to the sampling repository 500, which may be implemented in the ALD database 124 using the operational flow illustrated in FIG. 8.

The following information may be provided as parameters to the operational flow of FIG. 8: an identification (ID) of the device, temperature mode (either "heating" or "cooling"), duty cycle, current temperature read by the device, and previous temperature read by the device. Each temperature reading includes a device ID, a set point (which is only useful for environmentally-dependent devices), and variability factor measurement data (as described previously).

Initially, the ALD 100 determines (802) whether the device used any, or at least any appreciable amount of, energy. If not, then the logic flow ends. Otherwise, the ALD 100 determines (804) the time duration of the data sample, the time duration when the device was on, and the time duration when the device was off based on the data sample. Next, the ALD 100 determines (806) whether the received data comes from an environmentally-dependent device or an environmentally-independent (e.g., binary state) device. If the received data comes from an environmentally-dependent device, then the ALD 100 determines (808) the energy used per minute for the device, and determines (810) whether the device is drifting or powering. The ALD 100 determines that the device is drifting if the environmental characteristic monitored by the device is changing in a manner opposite the mode of the device (e.g., the room temperature is rising when the device is set in cooling mode or the room temperature is decreasing when the device is set in heating mode). Otherwise, the device is not drifting.

If the device is drifting, then the ALD 100 determines (814) the drift rate (e.g., degrees per minute). On the other hand, if the device is not drifting, then the ALD 100 determines (812) the power time rate. Once either the drift rate or the power time rate has been calculated, the ALD 100 determines (880) whether there is already a record in the sampling repository 500 for the device being measured under the present operating conditions of the device (e.g., set point and other variability factors (e.g., outside temperature)). If there is no existing record, then the ALD 100 creates (882) a new record using, for example, the device's ID, time of record, current set point, current outside temperature, energy used per minute, power time rate, and drift rate (assuming that either a power time rate or a drift rate has been determined). However, if there is an existing record, then the ALD 100 updates (884) the existing record by averaging the new data (including energy usage, drift rate, and power time rate) with the existing data and storing the result in the repository 500.

If the ALD 100 determines (806) that the received data comes from an environmentally-independent device, then the ALD 100 determines (842) the energy used per minute for the device and further determines (844) the energy saved per minute for the device. The ALD 100 then searches the repository 500 (e.g., ALD database (124)) to determine (890) whether there is already a record for the device for the applicable time period. If there is no existing record, then the ALD 100 creates (892) a new record using the device's ID, time of record, current time block, energy used per minute, and energy saved per minute. However, if there is an existing record, then the ALD 100 updates (894) the existing record by averaging the new data (including energy usage and energy savings) for the time block with the existing data for the time block and stores the result in the repository 500. For environmentally-independent devices, energy usage and energy savings are saved with respect to a block or period of time.

Figure 9:
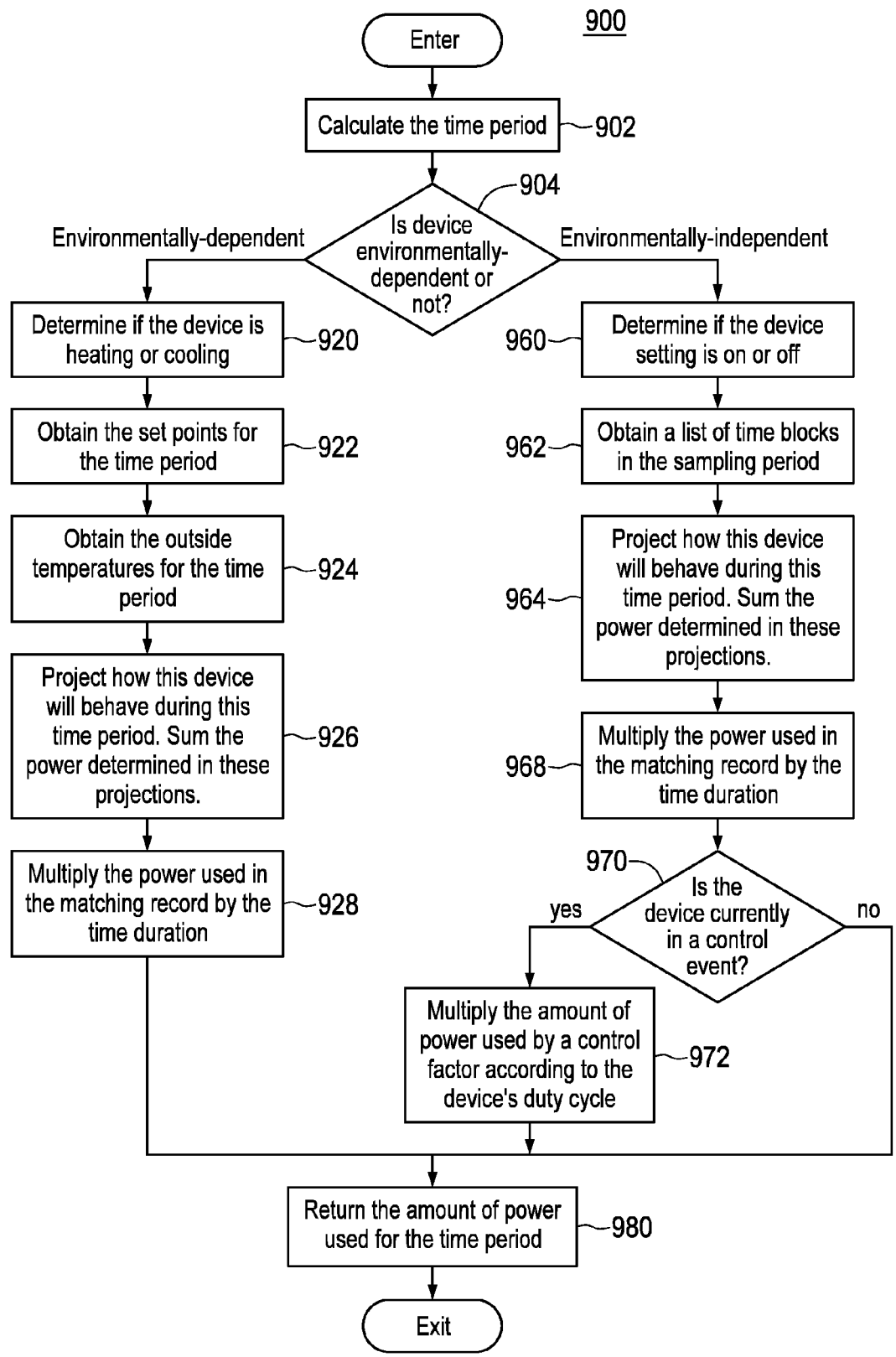
FIG. 9 is an operational flow diagram illustrating a method for projecting energy usage for a power consuming device in accordance with an exemplary embodiment of the present invention.

FIG. 9 illustrates an exemplary operational flow diagram 900 providing steps executed by the ALD 100 to project or estimate the energy usage expected of a device during a future time period in a given environment setting, in accordance with one embodiment of the present invention. The steps of FIG. 9 are preferably implemented as a set of computer instructions (software) stored in memory (not shown) of the ALD 100 and executed by one or more processors 160 of the ALD 100. In accordance with one embodiment, the operational flow of FIG. 9 may be executed by the power savings application 120 of the ALD 100 when a utility operator, or other operator of the ALD 100, wants to project the energy usage for a device over a specified time period in the future, such as during a period of time in which a control event is to occur.

The following information may be provided as parameters to the operational flow of FIG. 9: the device ID, the start time of the future time period, the end time of the future time period, the manage mode of the device, and, for an environmentally-independent device, a binary control factor. The manage mode is either "control" or "normal" to indicate whether the device is being measured during a control event or during normal operation, respectively. The binary control factor is preferably utilized for environmentally-independent devices and represents the duty cycle of the device. For example, if a water heater 40 runs at 20% duty cycle, the binary control factor is 0.2.

Initially, the ALD 100 (e.g., power savings application 120) determines (902) a future time period based on the start and stop times. The future time period may be set by the utility implementing the load control procedure of the present invention or a second utility that has requested delivery of operating reserve power from the utility implementing the load control procedure of the present invention. After the time period at issue is known, the power savings application 120 begins the procedure for projecting or estimating the amount of power that can be saved as the result of execution of a control event during the future time period. Accordingly, the power savings application 120 analyzes the devices to be controlled during the control event. Thus, the power savings application 120 determines (904) whether the devices include both environmentally-dependent and environmentally-independent (e.g., binary state) devices. For each environmentally-dependent device, the power savings application 120 determines (920) whether the device is in environment controlling (e.g., heating or cooling) mode. Next, the power savings application 120 retrieves (922) the anticipated set points for the device during the future time period of the control event and obtains (924) information regarding the outside environmental characteristic(s) (e.g., the outside temperatures) expected during the control event time period. The power savings application 120 then makes projections (926) about the device's expected power consumption behavior during the future time period. In one embodiment, the projection determination of block 926 is implemented using a best match algorithm, as described in detail below with respect to FIG. 10, to find stored repository records that best match the behavior of the device for each combination of set points, outside environmental characteristics (e.g., temperatures), and time periods, as measured and stored using the logic flow of FIG. 8. The power consumption behavior of the device is used to determine the amount of energy that would be expected to be used by the device if the control event did not occur and, thus, the amount of energy estimated or expected to be saved per unit time during the control event. The power savings application 120 multiplies (928) the saved power per unit time by the time duration of the future control event to determine the total amount of energy projected to be used by the device in the absence of the control event. The power savings application returns (980) the total projected amount of energy used by the device in the absence of the proposed control event.

However, if the power savings application 120 determines (904) that the proposed control event is to affect an environmentally-independent device, then the power savings application 120 determines (960) whether the device is currently scheduled to be on or off during the proposed time period of the control event. Next, the power savings application 120 creates, obtains, or otherwise determines (962) a list of time blocks for the specified control event time period. The power savings application 120 then makes projections (964) about the device's power consumption behavior during the future, control event time period. In one embodiment, the projection determination of block 964 is implemented using a best match algorithm, as described in detail below with respect to FIG. 10, to find stored repository records that best match the behavior of the device for each combination of set points, outside environmental characteristics (e.g., temperatures), and time periods, as measured and stored using the logic flow of FIG. 8. The power consumption behavior of the device is used to determine the amount of energy that would be expected to be used by the device if the control event did not occur and, thus, the amount of energy estimated or expected to be saved per unit time during the control event. Next, the power savings application 120 multiplies (968) the saved power per unit time by the time duration of the future control event to determine the total amount of energy projected to be used in the absence of the control event. If the projected energy savings is based on power consumption during a previous control event (970), then the power savings application 120 multiplies (972) the total amount of energy times the binary control factor to determine the amount of energy projected to be used by the device in the absence of the control event. The power savings application returns (980) the total projected amount of energy used by the device in the absence of the proposed control event.

One or ordinary skill in the art will readily recognize and appreciate that the operational flow of FIG. 9 may be used for each controlled device at a service point, for the controlled devices at multiple service points, or for all the controlled devices at all the service points supplied or supported by a utility. The total projected energy usage by the devices may be aggregated across a single service point, for all service points within a group, and/or for all groups served by the utility.

Figure 10:
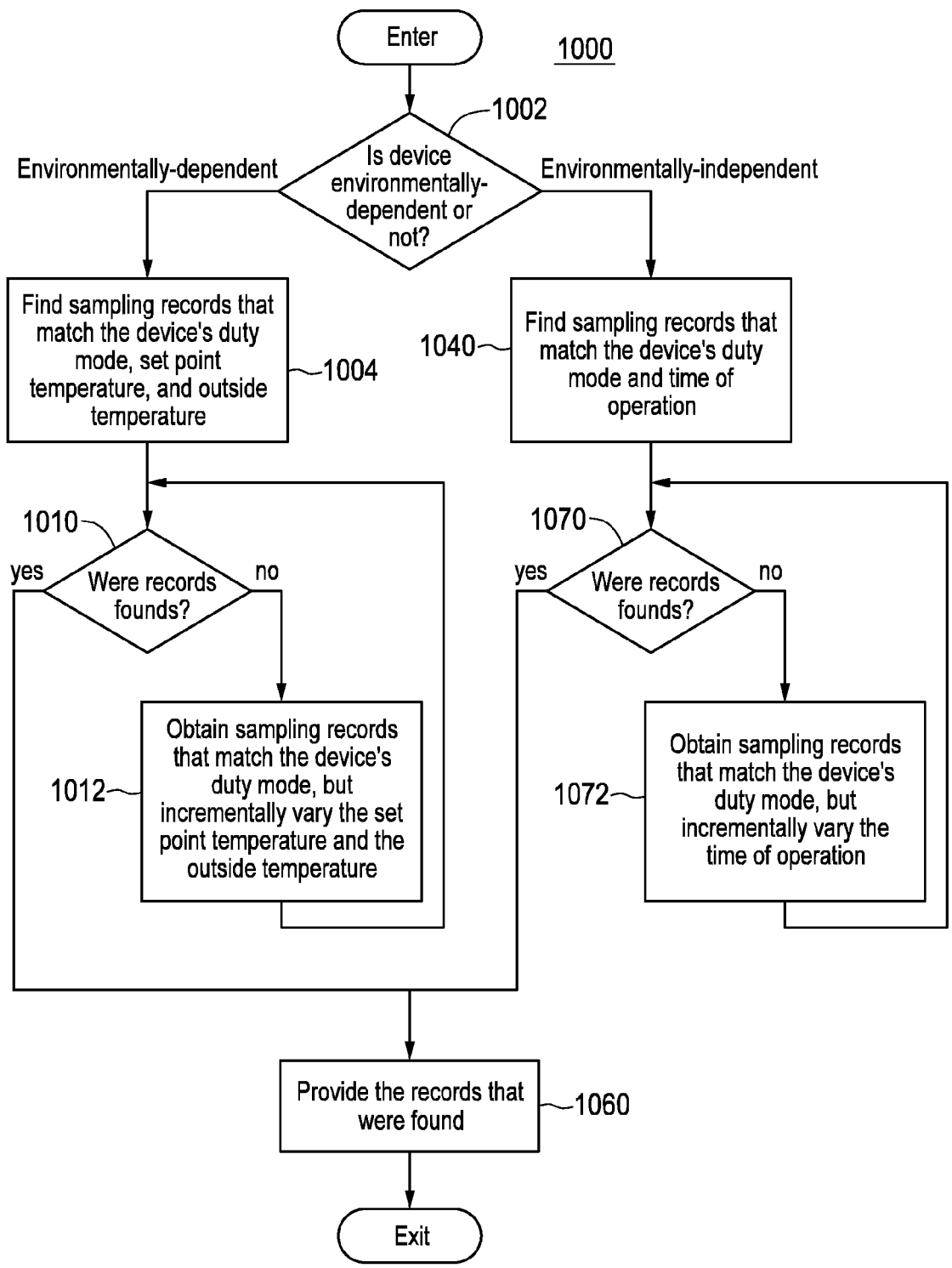
FIG. 10 is an operational flow diagram illustrating a method for estimating power consumption behavior of a power consuming device in accordance with an exemplary embodiment of the present invention.

FIG. 10 illustrates an exemplary operational flow diagram 1000 providing steps executed by the ALD 100 for estimating power consumption behavior of a device in accordance with an exemplary embodiment of the present invention. The algorithm or operational flow illustrated in FIG. 10 provides one embodiment for implementing steps 926 and 964 of FIG. 9. The operational flow of FIG. 10 determines which record or records in the sampling repository 500 provides the closest match to a given environment or operational setting for use in projecting device energy usage/savings during a time period of a future control event, in accordance with one embodiment of the present invention. The steps of FIG. 10 are preferably implemented as a set of computer instructions (software) stored in memory (not shown) of the ALD 100 and executed by one or more processors 160 of the ALD 100. The operational flow of FIG. 10 may be initiated by the ALD 100 when trying to identify or determine the sampling repository record or records that best match the power consumption behavior of a device in a specific setting.

In one embodiment, the operational flow of FIG. 10 is called during execution of the operational flow of FIG. 9 as noted above. When so called, the operational flow of FIG. 9 provides the operational flow of FIG. 10 with parameters that indicate the type of records to be searched. These parameters include, but are not limited to: a device ID, a duty mode (either on or off), a time period (e.g., corresponding to the time period of the proposed future control event), a set point delta, a delta or variance related to one or more environmental characteristics (e.g., outside temperature), and a time block delta. Duty mode signifies the duty cycle of the device. If the duty mode is TRUE or ON, significant power is being consumed. If the duty mode is FALSE or OFF, significant power is not being consumed (i.e., power is being saved). Duty cycle exists for switch-controlled, binary state, or environmentally-independent devices which go ON and OFF irrespective of the influence or affect of environment. For HVAC devices 50, duty mode is always ON. Set point delta is the amount a set point may be varied during a search in order to find a matching repository record. Outside temperature/environmental characteristic delta is the number of temperature degrees or other change in environmental characteristics over which data relating to the outside temperature or other environmental characteristics may be varied during a search in order to find a matching repository record. Time block delta is the amount of time a time block may be varied during a search in order to find a matching repository record.

Initially, the ALD 100 determines (1002) whether the requested repository search relates to an environmentally-dependent device or an environmentally-independent device. If the search relates to an environmentally-dependent device, then the ALD 100 attempts to find (1004) power consumption records in the sampling repository 500 that match the device ID, duty mode, environmental characteristic (e.g., temperature) set point, and associated outside environmental characteristic data. Power consumption records include power consumption data, such as power consumed, current drawn, duty cycle, operating voltage, operating impedance, time period of use, set points, ambient and outside temperatures during use (as applicable), and/or various other energy use data. If a record exists that matches all the power consumption search criteria, such record would be considered the record that most closely matches the given environment setting. If no exact match is found (1010), then the ALD 100 begins looking for records that slightly differ from the given environment setting. In one embodiment, the ALD 100 incrementally increases or decreases (1012) the environment-related search criteria (e.g., temperature set point and/or outside/ambient temperature) using the set point delta and/or outside temperature/environmental characteristic delta as a guide to look for relevant records. Such incremental/iterative modification of the search criteria continues until either relevant records are found or some applicable limit (e.g., as indicated by the set point delta and/or other parameter deltas) is reached.

If the ALD 100 determines (1002) that the search relates to an environmentally-independent device, then the ALD 100 attempts to find (1040) power consumption records in the sampling repository 500 that match the device ID, duty mode, and time of operation (corresponding to the expected, future time of the control event). If a record is not found that matches all the search criteria (1070), then the ALD 100 modifies its search to look for records that slightly differ from the given environment setting. In one embodiment, the ALD 100 modifies its search by incrementally increasing or decreasing (1072) the time of operation for a given duty mode. The iterative searching continues until either relevant records are found or some applicable limit (e.g., as indicated by the time block delta or other parameter deltas) is reached. Any records that were found as a result of the search are provided (1060) to the requesting program (e.g., the operational flow of FIG. 9). The result of the operational flow of FIG. 10 is a set of one or more power consumption records from the sampling repository 500 that are the closest match to the given environment or proposed control event setting.

Figure 11:
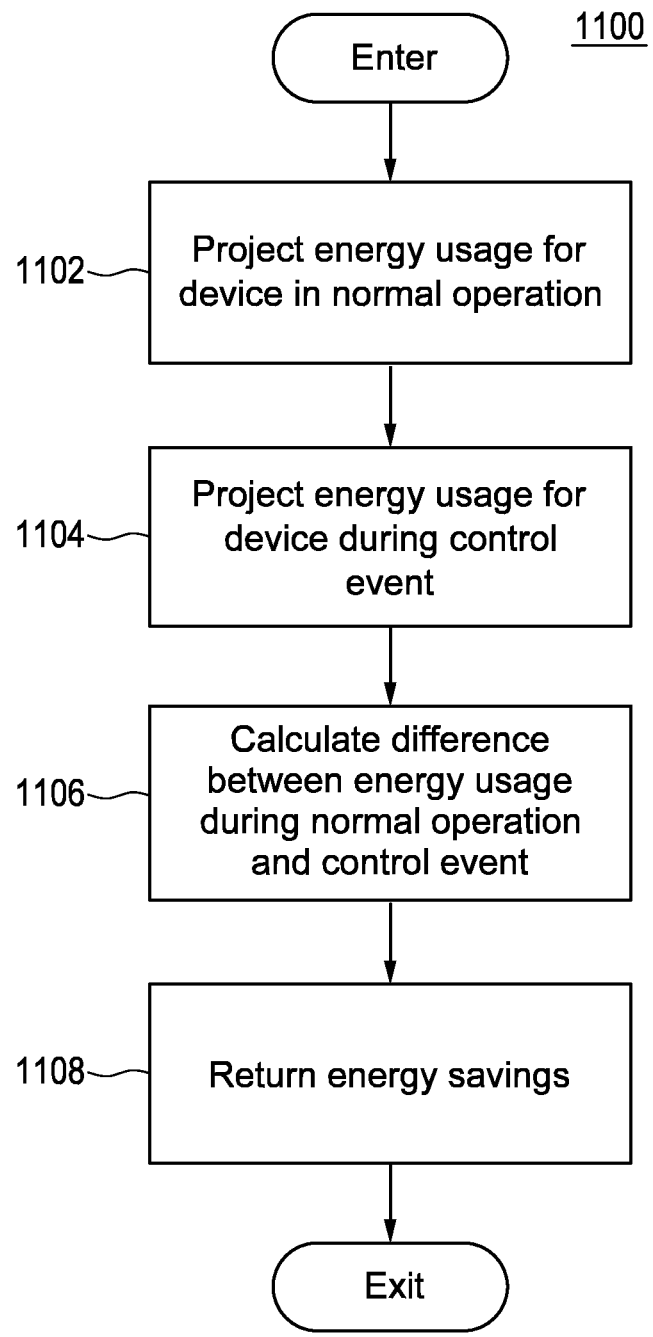
FIG. 11 is an operational flow diagram illustrating a method for projecting energy savings through power interruption to a power consuming device during a control event, in accordance with an exemplary embodiment of the present invention.

FIG. 11 illustrates an exemplary operational flow diagram 1100 providing steps executed by the ALD 100 to project energy savings through power interruption or reduction to a device during a control event, in accordance with one embodiment of the present invention. The steps of FIG. 11 are preferably implemented as a set of computer instructions (software) stored in memory (not shown) of the ALD 100 and executed by one or more processors 160 of the ALD 100. As with the operational flow of FIG. 9, the operational flow of FIG. 11 may be executed by the power savings application 120 when an operator of the utility or of the ALD 100 wants to project the energy savings for a device over a specified time period during operation of a control event.

The following information may be provided as parameters to the operational flow of FIG. 11: a device ID, a start time of the control event, an end time of the control event, and a binary control factor, as described above in connection with FIG. 9. Initially, the ALD 100 (e.g., power savings application 120) projects (1102) the energy usage/power consumption for the device during normal operation within the expected time period of the control event using, for example, the operational flow of FIG. 9. Next, the power savings application 120 projects (1104) the power consumption for the device during the control event using, for example, the operational flow of FIG. 9. For example, depending on the duty cycle, set points, drift or drift rate, power time, and other parameters for the device, the device may be projected to be on and consuming power for some amount of time during the time period of the control event. Thus, both the expected amount of power consumed during normal operation (i.e., in the absence of any control event) and the expected amount of power consumed during the control event are determined to accurately assess any possible power savings as a result of the control event. After the two projected power consumption values have been determined, the power savings application 120 calculates (1106) the difference between the two values, which is the projected power consumption for the device during the control event time period. Because the projected power consumption will not be realized during the control event, such power consumption corresponds directly to an amount of energy saved during the control event. The power savings application 120 returns (1108) the projected energy savings value. One of ordinary skill in the art will readily recognize and appreciate that the power savings application 120 may aggregate the projected power savings for all controlled devices at a service point 20, for all controlled devices at service points within a group, or for controlled devices within all service point groups served by the utility to obtain an aggregate amount of power savings as a result of a control event.

Another context in which the ALMS 10 may be utilized is in conjunction with other renewable energy sources. A number of renewable energy sources, such as wind power and solar power, are variable in nature. That is, such energy sources do not generate power at a constant rate. For example, wind increases or decreases from moment to moment. Wind turbines can generate a large amount of power due to large winds or can stop generating completely due to lack of any wind. Solar panels may be able to generate a great deal of power on very sunny days, a little power on cloudy days, and virtually no power at night.

As a result, power utilities that make use of renewable energy must compensate for the under-generation or over-generation of power from those sources. When renewable energy sources are under-generating, the ALMS 10 may utilize the processes disclosed above to provide additional operating reserve to compensate for the lack of power generation by the renewable energy source and for the effects resulting therefrom, including output frequency instability. For example, a utility utilizing wind or solar energy sources may further incorporate the ALMS 10 into the utility distribution system to provide regulating reserve during time periods of under-generation.

Figure 12:
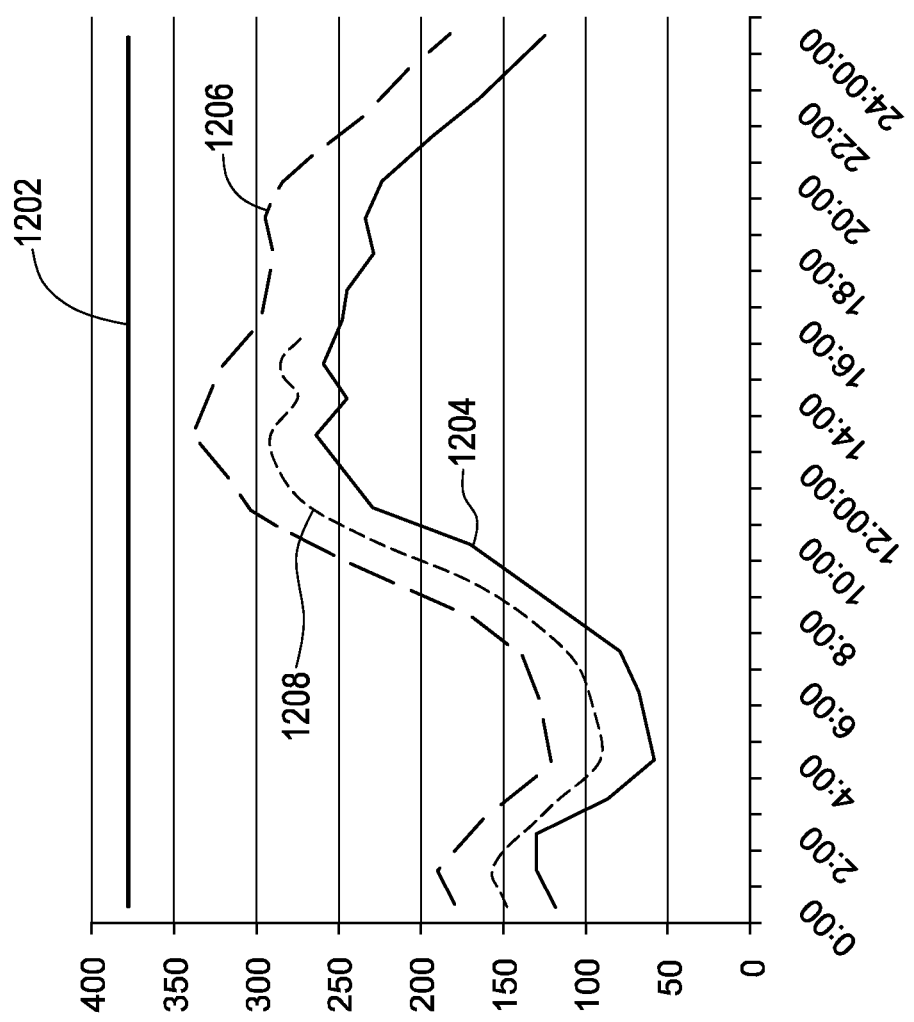
FIG. 12 is a graph that depicts a load profile of a utility during a projected time period, showing actual energy usage as well as projected energy usage determined with and without a control event, in accordance with an exemplary embodiment of the present invention.

FIG. 12 is a graph that depicts the "load profile" of a utility over a predetermined time period, showing actual energy usage as well as projected energy usage determined with and without a control event in accordance with an exemplary embodiment of the present invention. The load profile graph depicts the following:

a. Baseline power consumption 1202. This is the total possible load of, or power consumed by, all controlled devices over a specified period of time.

b. Projected interruptible load usage 1204 (i.e., projected load or energy usage with a control event) for all controlled devices at all service points (or at selected service points) served by the utility in the absence of a control event. The projected interruptible load usage may be determined in one embodiment through execution of the operational flow of FIG. 9. The projected interruptible load available 1204 indicates the load for all controlled devices if they are controlled 100% of the time using customer preferences.

c. Projected interruptible load available 1206 (i.e., projected energy used when no control events are used) for all controlled devices at all service points (or at selected service points) served by the utility during a control event. The projected interruptible load usage may be determined in one embodiment through execution of the operational flow of FIG. 11.

d. Actual interruptible load usage 1208 for all controlled devices at all service points (or at selected service points) served by the utility. The actual interruptible load usage 1208 is the power that is currently being used by all controlled devices.

This type of load profile graph may be generated for all controlled devices at a service point 20, for controlled devices at all service points within a group, or for controlled devices at all groups served by the utility.

In the load profile graph of FIG. 12, the capacity under contract is shown as a straight double line at the top of the graph and indicates the baseline power consumption 1202. The baseline power consumption 1202 represents the total amount of power that the utility is obligated to provide. The actual interruptible load usage 1208 is the actual energy usage of all devices controlled by the utility. The projected interruptible load usage 1204 at the bottom of the load profile graph is the projected energy used when control events are used, and the projected interruptible load available 1206 is the projected energy usage when control events are not used. The difference between the projected interruptible load usage 1204 and the projected interruptible load available 1206 is the capacity that may be used for operating reserve, including regulating reserve, spinning reserve, and non-spinning reserve.

Normally, when a utility observes energy demand that is near its peak capacity, it will attempt to initiate control events for customers who voluntarily participate in power saving programs (i.e., flexible load-shape programs, as described earlier). Typically, these control events will provide sufficient capacity to prevent the utility from using non-spinning reserve. However, there are situations in which a sufficient number of customers may have manually decided to opt out of power saving programs and, as a result, the utility would be unable to recover enough energy to meet its spinning reserve needs from its remaining customers who voluntarily participate in the program. Such a situation could happen, for instance, on a very hot day when many people are home, such as on a holiday or a day over the weekend. In such a case, the utility would still be in danger of using non-spinning reserve or even running out of reserve capacity altogether. In such a situation, the utility would be in a "critical control" mode. In critical control mode, the utility may override all customer preferences, including both those who voluntarily participate in power saving programs and those who do not. During periods of critical control, the utility may utilize the ALD 100 to adjust settings of environmentally-dependent devices to settings outside of normal comfort preferences (but not life-threatening). Invoking critical control enables a utility to return power demand to acceptable levels.

Use of the ALMS 10 may help a utility mitigate the likelihood of critical control situations. For example, whenever a customer overrides or opts out of a control event, the ALMS 10, using the techniques disclosed herein, finds additional customers who may be the target of a voluntary control event. Analogously, when controlled devices that are participating in a control event are required to exit the control event due to customer preferences (e.g., the amount of time that the customer's devices may participate in a control event), the ALD 100 may release such devices from the control event and replace them with other voluntarily controlled devices. The replacement devices would then preferably supply, through deferment, at least the same amount of reserve power as was being sourced by the devices that were released from the control event. Thus, the system 10 of the present invention increases the likelihood that a utility will be able to spread control events to other customers before invoking critical control.

In a further embodiment, the entire ALMS 10 described in FIG. 3 may also be implemented in a proprietary network that is IP-based, real-time, temperature-derived, verifiable, interactive, two-way, and responsive to Automatic Generation Control (AGC) commands to produce operating reserve power through implementation of control events.

In an additional embodiment of the present invention, the sampling data stored in the repository 500 using the operational flow of FIG. 5 could also include other factors (called "variability factors") related to power consumption, such as day of the week, humidity, amount of sunshine, or number of people in the household. This additional data would allow the projected energy usage and projected energy savings to be more accurate based on these additional factors. To make use of this data, the ALD 100 may obtain the additional data from sources within and/or external to the ALMS 10, such as weather databases, live weather feeds from sources such as National Weather Reporting stations, outdoor sensors 94, or any weather related input device commercially available on a real time or predictive basis, calendars, and voluntary customer feedback. Some of the variability factor measurements are available from public sources, while others are available via private sources.

In another alternative embodiment of the present invention, transmission line loss may be included in the projected energy savings determination of FIG. 11. As those of ordinary skill in the art will recognize and appreciate, the amount of power supplied by a utility to source a device remote from the utility equals the amount of power required by the device plus the amount of power lost in the transmission lines between the utility's power generation plant and the location of the device. Thus, the projected energy savings resulting from a control event may be determined by determining an amount of power expected to be consumed by the controlled device or devices at a service point, at multiple service points or throughout the entire service area of the utility during the time period of the control event absent occurrence of the control event to produce first energy savings, determining an amount of power that is not expected to be dissipated in transmission lines as a result of not delivering power to the controlled device or devices during the control event to produce second energy savings, and summing the first energy savings and the second energy savings.

Figure 13:
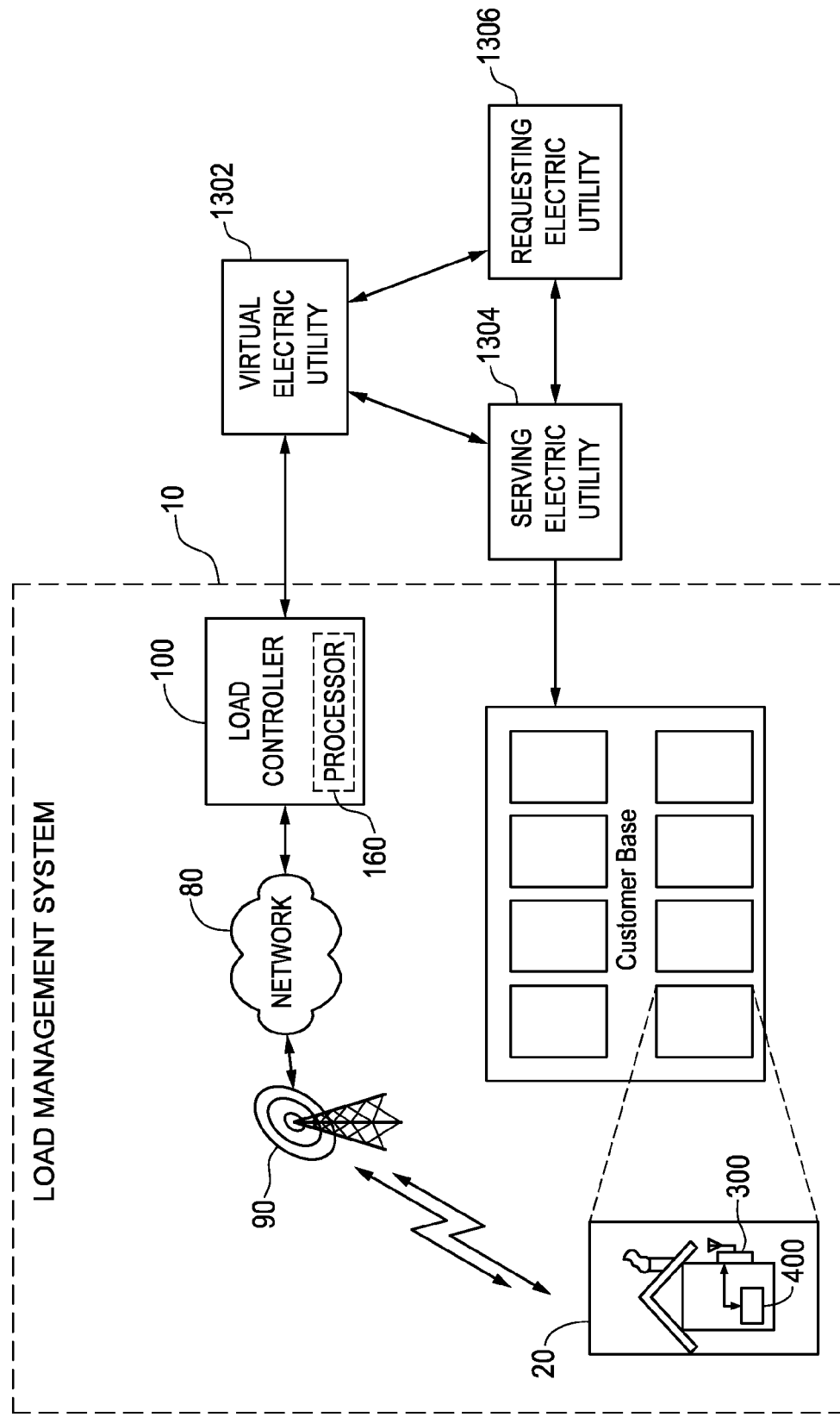
FIG. 13 is a block diagram of a system for implementing a virtual electric utility in accordance with an exemplary embodiment of the present invention.

In a further embodiment of the present invention, the operating reserve (e.g., spinning reserve or regulating reserve) determined by a utility using the techniques disclosed above can be sold to a requesting utility 1306, as illustrated in FIG. 13, which is essentially a replication of FIG. 9 of U.S. Patent Application Publication No. US 2009/0063228 A1. As explained in U.S. Patent Application Publication No. US 2009/0063228 A1, the saved power may then be distributed to the requesting utility 1306 after commencement of the control event (e.g., during and/or after completion of the control event) conducted by the selling utility. The selling utility may be a virtual utility 1302 or a serving utility 1304 as illustrated in FIG. 13 and described in detail in U.S. Patent Application Publication No. US 2009/0063228 A1. Alternatively, a third party may serve as a managing entity to manage operation of the ALMS 10 and the resultant distribution of operating reserve to a requesting utility 1306 subsequent to commencement of a control event.

In yet another embodiment, the ALD 100 for a utility may determine projected energy savings for each service point 20 served by the utility in accordance with the operational flow of FIG. 11 and aggregate the projected energy savings across all service points served by the utility to obtain the total projected energy savings from which operating reserve may be determined as described above.

In a further embodiment, instead of or in addition to using the operational flow of FIG. 10 in an attempt to find a best match data point in the repository 500 for use in estimating power consumption behavior of a device when the time period of the control event does not correspond to a time period in the repository 500, the ALD 100 may determine whether the repository 500 includes power consumption data for the device during time periods before and after the expected time period of the control event and, if so, interpolate a value corresponding to an amount of power expected to be consumed by the device during the time period of the control event based on the power consumption data for the device during the time periods before and after the expected time period of the control event.

In yet another embodiment, a requesting utility may utilize a method for acquiring operating reserve power from a sourcing utility. According to this embodiment, the requesting utility requests operating reserve power from the sourcing utility sufficiently in advance of a transfer time at which the operating reserve power will be needed so as to facilitate measurable and verifiable load-controlled generation of the operating reserve power. The load-controlled generation of the operating reserve power results from a determination of operating reserve as detailed above with respect to FIGS. 7-12. The requesting utility receives an acknowledgment from the sourcing utility indicating that the sourcing utility will supply the operating reserve power at the transfer time. Then, at the transfer time and for a time period thereafter, the requesting utility receives at least some of the operating reserve power from the sourcing utility.

In a further embodiment, the operating reserve determination techniques may be utilized by a virtual utility 1302 as disclosed in U.S. Patent Application Publication No. US 2009/0063228 A1. For example, the virtual utility 1302 may be operable to at least offer energy to one or more requesting utilities 1306 for use as operating reserve for the requesting utilities 1306. In such a case, the virtual utility 1302 may include, among other things, a repository 500 and a processor 160 (e.g., within an ALD 100). In this embodiment, the processor 160 is operable to remotely determine, during at least one period of time, power consumed by at least one device to produce power consumption data. The processor 160 is further operable to store the power consumption data in the repository 500 and, at the appropriate time, determine an expected, future time period for a control event during which power is to be reduced to the device or devices. The processor 160 is also operable to estimate, prior to commencement of the control event, power consumption behavior expected of the device or devices during the time period of the control event based at least on the stored power consumption data. The processor 160 is further operable to determine, prior to commencement of the control event, projected energy savings resulting from the control event based at least on the estimated power consumption behavior of the device or devices. Still further, the processor 160 is operable to determine, prior to commencement of the control event, operating reserve based on the projected energy savings. After determination of the operating reserve, the processor 160 is operable to communicate an offer to supply the operating reserve to a requesting utility 1306 or utilities.

As described above, the present invention encompasses a system and method for determining operating reserve capacity using an ALD or comparable device, software, or combination thereof so that the operating reserve capacity may be made available to the power utility that generated the operating reserve through load control or to the power market generally (e.g., via the FERC grid). When a utility requires power beyond its native load, the utility must make use of its operating reserve or acquire the additional power via the FERC grid from other utilities. As discussed above, one type of operating reserve is spinning reserve. Spinning reserve is additional generating capacity that is already connected to the power system and, thus, is almost immediately available. In accordance with one embodiment of the present invention, the ALD makes spinning reserve available to a utility. Thus, through use of the ALD, a utility (power generating utility or a virtual utility) can determine or project spinning reserve or other operating reserve that is available through interruptible power savings at service points. The spinning reserve is measurable and verifiable, and can be projected for a number of days in advance, and such projections can be sold to other utilities on the open market.

As disclosed above, the ALD 100 may be considered to implement a type of flexible load-shape program. However, in contrast to conventional load control programs, the load-shape program implemented by the ALD 100 projects an amount of operating reserve resulting from selective control of devices (loads) based on known, real-time customer preferences. In addition, due to its communication and control mechanisms, the ALD 100 can project power savings, as well as operating reserve (e.g., regulating, spinning and/or non-spinning reserve) that is active, real-time, verifiable, and measurable so as to comply with protocols and treaties established for the determination of carbon credits and offsets, as well as renewable energy credits. The information acquired by the ALD 100 is not simply samples of customer preferences and data, but actual power consumption information.

In the foregoing specification, the present invention has been described with reference to specific embodiments. However, one of ordinary skill in the art will appreciate that various modifications and changes may be made without departing from the spirit and scope of the present invention as set forth in the appended exemplary claims. For example, the passive sampling algorithm of FIG. 8, the projected energy usage algorithm of FIG. 9, the best sampling match algorithm of FIG. 10, and the projected energy savings algorithm of FIG. 11 may be performed by one or more equivalent means. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A method for estimating operating reserve of a utility servicing one or more service points, the method comprising:
    determining amounts of electric power consumed by at least one device during multiple periods of time to produce power consumption data, the at least one device being located at the one or more service points;
    storing the power consumption data in a repository;
    determining that a control event is to occur during which a supply of electric power is to be reduced to the at least one device;
    after storage of the power consumption data in the repository and prior to commencement of the control event, estimating, under an assumption that the control event is not to occur, power consumption behavior expected of the at least one device during a future period of time based at least on the stored power consumption data, wherein the control event is expected to occur during the future period of time;
    determining, prior to commencement of the control event, energy savings expected to result from the control event based at least on the estimated power consumption behavior of the at least one device to produce projected energy savings; and
    determining, prior to commencement of the control event, an amount of available operating reserve based on the projected energy savings;
    wherein determining energy savings expected to result from the control event includes:
        determining an amount of power expected to be consumed by the at least one device during the future period of time absent occurrence of the control event to produce first energy savings;
        determining an amount of power that is not expected to be dissipated in transmission lines as a result of withholding delivery of power to the at least one device during the control event to produce second energy savings; and
        summing the first energy savings and the second energy savings.

2. The method of claim 1, further comprising:
    distributing the available operating reserve subsequent to commencement of the control event.

3. The method of claim 2, wherein the utility utilizes at least some renewable energy produced by a renewable energy source and wherein the available operating reserve is distributed to provide regulating reserve during times of under-generation by the renewable energy source.

4. The method of claim 1, further comprising:
    managing distribution of the available operating reserve subsequent to commencement of the control event.

5. The method of claim 1, wherein determining that a control event is to occur comprises:
    determining that a control event is to occur responsive to receipt of an Automatic Generation Control command.

6. The method of claim 1, wherein determining energy savings expected to result from the control event further comprises:
    determining an intermediate projected energy savings for each service point at which one or more devices are to be affected by the control event; and
    aggregating the intermediate projected energy savings for a plurality of service points to produce the projected energy savings.

7. The method of claim 1, wherein the step of storing the power consumption data in a repository comprises:
    storing the power consumption data in a repository remote from the one or more service points.

8. The method of claim 1, wherein the step of determining projected energy savings is performed on a service point by service point basis.

9. The method of claim 1, wherein the step of determining projected energy savings is performed on a utility-wide basis.

10. The method of claim 1, further comprising:
    initiating the control event;
    determining that a first set of one or more devices is to be released from the control event prior to termination of the control event; and
    determining a second set of one or more devices to replace the first set of devices, wherein projected energy savings from the second set of devices is greater than or equal to an energy savings from the first set of devices.

11. A method for estimating operating reserve of a utility servicing one or more service points, the method comprising:
    determining amounts of electric power consumed by at least one device during multiple periods of time to produce power consumption data, the at least one device being located at the one or more service points and including at least one environmentally-dependent device;
    storing the power consumption data in a repository;
    determining that a control event is to occur during which a supply of electric power is to be reduced to the at least one device;
    after storage of the power consumption data in the repository and prior to commencement of the control event, estimating, under an assumption that the control event is not to occur, power consumption behavior expected of the at least one device during a future period of time based at least on the stored power consumption data, wherein the control event is expected to occur during the future period of time;
    determining, prior to commencement of the control event, energy savings expected to result from the control event based at least on the estimated power consumption behavior of the at least one device to produce projected energy savings; and
    determining, prior to commencement of the control event, an amount of available operating reserve based on the projected energy savings;

wherein the step of estimating power consumption behavior expected of the at least one device includes:
  determining at least one environmental characteristic expected during the future period of time at a service point at which the at least one environmentally-dependent device is located;
  determining, based on stored user settings, a maximum allowable variance of the at least one environmental characteristic in an area at the service point monitored by the environmentally-dependent device; and
  estimating, prior to commencement of the control event and based at least on the stored power consumption data, the at least one environmental characteristic and the maximum allowable variance of the at least one environmental characteristic, an amount of power that the at least one environmentally-dependent device would be expected to consume during the future period of time if the control event was not to occur.

12. The method of claim 11, wherein determining at least one environmental characteristic expected during the future period of time comprises:
  receiving information associated with the at least one environmental characteristic from at least one of a local weather service, a state weather service, and a national weather service.

13. The method of claim 11, wherein power consumption data associated with the service point further includes at least one of a user setting for the maximum allowable variance of the at least one environmental characteristic at the service point and information relating to operating environments in which the at least one environmentally-dependent device has operated, and wherein estimating power consumption behavior expected of the at least one environmentally-dependent device during the future period of time further comprises:
  comparing the future period of time to time periods stored in the repository;
  in the event that at least one time period stored in the repository corresponds to at least part of the future period of time, determining whether the repository includes power consumption data for the at least one environmentally-dependent device during the at least one time period;
  in the event that the repository includes power consumption data for the at least one environmentally-dependent device during the at least one time period,
    determining whether at least some of the power consumption data for the at least one time period corresponds to a user setting and an environmental characteristic expected during the future period of time;
  in the event that at least some of the power consumption data for the at least one time period corresponds to a user setting and an environmental characteristic expected during the future period of time, retrieving from the repository values corresponding to amounts of power that the at least one environmentally-dependent device would be expected to consume during the at least one time period if the control event was not to occur;
  in the event that none of the power consumption data for the at least one time period corresponds to a user setting and an environmental characteristic expected during the future period of time, changing at least one of a search value corresponding to an expected user setting and a search value corresponding to an expected environmental characteristic to produce at least one of a changed user setting search value and a changed environmental characteristic search value; and
    determining whether at least some of the power consumption data for the at least one time period corresponds to at least one of the changed user setting search value and the changed environmental characteristic search value;
  in the event that the repository does not include power consumption data for the at least one environmentally-dependent device during the at least one time period,
    determining whether the repository includes at least some power consumption data for the at least one environmentally-dependent device during a time period proximate in time to the at least one time period; and
    in the event that the repository includes at least some power consumption data for the at least one environmentally-dependent device during a time period proximate in time to the at least one time period, retrieving from the at least some power consumption data values corresponding to amounts of power that the at least one environmentally-dependent device would be expected to consume during the at least one time period if the control event was not to occur.

14. The method of claim 11, wherein the at least one environmental characteristic is at least one of air temperature, humidity, barometric pressure, wind speed, rainfall amount, and water temperature.

15. A method for estimating operating reserve of a utility servicing one or more service points, the method comprising:
  determining amounts of electric power consumed by at least one device during multiple periods of time to produce power consumption data, the at least one device being located at the one or more service points and including at least one environmentally-independent device;
  storing the power consumption data in a repository;
  determining that a control event is to occur during which a supply of electric power is to be reduced to the at least one device;
  after storage of the power consumption data in the repository and prior to commencement of the control event, estimating, under an assumption that the control event is not to occur, power consumption behavior expected of the at least one device during a future period of time based at least on the stored power consumption data, wherein the control event is expected to occur during the future period of time;
  determining, prior to commencement of the control event, energy savings expected to result from the control event based at least on the estimated power consumption behavior of the at least one device to produce projected energy savings; and
  determining, prior to commencement of the control event, an amount of available operating reserve based on the projected energy savings;
  wherein estimating power consumption behavior expected of the at least one device during the future period of time includes:
    determining whether, absent occurrence of the control event, the at least one environmentally-independent device is expected to be consuming power during the future period of time period based on the stored power consumption data;

in the event that, absent occurrence of the control event, the at least one environmentally-independent device would be consuming power during the future period of time,
determining a duty cycle for the at least one environmentally-independent device based on the stored power consumption data; and
estimating, based on the stored power consumption data and the duty cycle, an amount of power that the at least one environmentally-independent device would be expected to consume during the future period of time if the control event was not to occur.

16. A method for estimating operating reserve of a utility servicing one or more service points, the method comprising:
determining amounts of electric power consumed by at least one device during multiple periods of time to produce power consumption data, the at least one device being located at the one or more service points and including at least one environmentally-dependent device;
storing the power consumption data in a repository, wherein the repository includes a plurality of time periods and wherein power consumption data is stored in the repository in association with the multiple time periods during which electric power was determined to be consumed by the at least one device;
determining that a control event is to occur during which a supply of electric power is to be reduced to the at least one device;
after storage of the power consumption data in the repository and prior to commencement of the control event, estimating, under an assumption that the control event is not to occur, power consumption behavior expected of the at least one device during a future period of time based at least on the stored power consumption data, wherein the control event is expected to occur during the future period of time;
determining, prior to commencement of the control event, energy savings expected to result from the control event based at least on the estimated power consumption behavior of the at least one device to produce projected energy savings; and
determining, prior to commencement of the control event, an amount of available operating reserve based on the projected energy savings;
wherein estimating power consumption behavior of the at least one device includes:
comparing the future period of time to time periods stored in the repository;
in the event that the future period of time corresponds to at least one particular time period stored in the repository, determining whether the repository includes power consumption data for the at least one device during the at least one particular time period; and
in the event that the repository includes power consumption data for the at least one device during the at least one particular time period, retrieving from the repository one or more values corresponding to one or more amounts of power that the at least one device would be expected to consume during the future period of time if the control event was not to occur.

17. The method of claim 16, further comprising:
in the event that the repository does not include power consumption data for the at least one device during the at least one particular time period,
determining whether the repository includes power consumption data for the at least one device during time periods before and after the at least one particular time period; and
interpolating, based on the power consumption data for the at least one device during the time periods before and after the at least one particular time period, one or more values corresponding to one or more amounts of power that the at least one device would be expected to consume during the at least one particular time period if the control event was not to occur.

18. The method of claim 16, further comprising:
in the event that the future period of time does not correspond to at least one time period stored in the repository,
determining whether the repository includes power consumption data for the at least one device during time periods before and after the future period of time; and
interpolating, based on the power consumption data for the at least one device during the time periods before and after the future period of time, one or more values corresponding to one or more amounts of power that the at least one device would be expected to consume during the future period of time if the control event was not to occur.

19. A system for implementing a virtual utility that is operable to at least offer energy to one or more requesting utilities for use as operating reserve for the requesting utilities, the system comprising:
a repository; and
at least one processor coupled to the repository, the at least one processor operable to:
determine amounts of electric power consumed by at least one device during multiple periods of time to produce power consumption data, the at least one device being located remotely from the processor;
store the power consumption data in the repository;
determine that a control event is to occur during which a supply of electric power is to be reduced to the at least one device;
after storage of the power consumption data in the repository and prior to commencement of the control event, estimate, under an assumption that the control event is not to occur, power consumption behavior expected of the at least one device during a future period of time based at least on the stored power consumption data, wherein the control event is expected to occur during the future period of time;
determine, prior to commencement of the control event, energy savings expected to result from the control event based at least on the estimated power consumption behavior of the at least one device to produce projected energy savings;
determine, prior to commencement of the control event, an amount of operating reserve based on the projected energy savings; and
manage distribution of the amount of operating reserve to at least one of the requesting utilities subsequent to commencement of the control event;
wherein determination of energy savings expected to result from the control event includes:
determining an amount of power expected to be consumed by the at least one device during the future period of time absent occurrence of the control event to produce first energy savings;
determining an amount of power that is not expected to be dissipated in transmission lines as a result of withholding delivery of power to the at least one device during the control event to produce second energy savings; and summing the first energy savings and the second energy savings.

20. The system of claim 19, wherein the at least one processor is further operable to determine that the control event is to occur responsive to receipt of an Automatic Generation Control command.

\* \* \* \* \*

UNITED STATES PATENT AND TRADEMARK OFFICE
CERTIFICATE OF CORRECTION

| | | |
|---|---|---|
| PATENT NO. | : 9,069,337 B2 | Page 1 of 1 |
| APPLICATION NO. | : 13/784211 | |
| DATED | : June 30, 2015 | |
| INVENTOR(S) | : Joseph W. Forbes, Jr. et al. | |

It is certified that error appears in the above-identified patent and that said Letters Patent is hereby corrected as shown below:

In The Claims

In column 26, line 21, between "the" and "at" insert --repository--.

Signed and Sealed this
Twenty-third Day of February, 2016

Michelle K. Lee
*Director of the United States Patent and Trademark Office*